Aug. 4, 1953 C. W. FAILOR ET AL 2,647,987

CENTRALIZED TRAFFIC CONTROL SYSTEM FOR RAILROADS OF THE NORMALLY DEENERGIZED REVERSIBLE CODED TRACK CIRCUIT TYPE, INCLUDING OUTLYING TRACK SWITCH PROTECTION

Filed March 11, 1948

7 Sheets-Sheet 1

INVENTORS.
Charles W. Failor and
Charles B. Shields
BY
[signature]
THEIR ATTORNEY Aug. 4, 1953 C. W. FAILOR ET AL 2,647,987

CENTRALIZED TRAFFIC CONTROL SYSTEM FOR RAILROADS OF THE NORMALLY DEENERGIZED REVERSIBLE CODED TRACK CIRCUIT TYPE, INCLUDING OUTLYING TRACK SWITCH PROTECTION

Filed March 11, 1948 7 Sheets-Sheet 2

INVENTORS.
Charles W. Failor and
Charles B. Shields
BY [signature]
THEIR ATTORNEY Aug. 4, 1953 C. W. FAILOR ET AL 2,647,987

CENTRALIZED TRAFFIC CONTROL SYSTEM FOR RAILROADS OF THE NORMALLY DEENERGIZED REVERSIBLE CODED TRACK CIRCUIT TYPE, INCLUDING OUTLYING TRACK SWITCH PROTECTION

Filed March 11, 1948

7 Sheets-Sheet 3

INVENTORS.
Charles W. Failor and
BY Charles B. Shields

THEIR ATTORNEY

Aug. 4, 1953 C. W. FAILOR ET AL 2,647,987

CENTRALIZED TRAFFIC CONTROL SYSTEM FOR RAILROADS OF THE NORMALLY DEENERGIZED REVERSIBLE CODED TRACK CIRCUIT TYPE, INCLUDING OUTLYING TRACK SWITCH PROTECTION

Filed March 11, 1948 7 Sheets-Sheet 4

INVENTORS.
Charles W. Failor and
BY Charles B. Shields

THEIR ATTORNEY

INVENTORS.
Charles W. Failor and
BY Charles B. Shields

THEIR ATTORNEY

INVENTORS.
Charles W. Failor and
BY Charles B. Shields.

THEIR ATTORNEY

INVENTORS.
Charles W. Failor and
BY Charles B. Shields
THEIR ATTORNEY

Patented Aug. 4, 1953

2,647,987

UNITED STATES PATENT OFFICE 2,647,987

CENTRALIZED TRAFFIC CONTROL SYSTEM FOR RAILROADS OF THE NORMALLY DEENERGIZED REVERSIBLE CODED TRACK CIRCUIT TYPE, INCLUDING OUTLYING TRACK SWITCH PROTECTION

Charles W. Failor, Forest Hills, and Charles B. Shields, Penn Township, Allegheny County, Pa., assignors to Westinghouse Air Brake Company, a corporation of Pennsylvania Application March 11, 1948, Serial No. 14,244

14 Claims. (Cl. 246—3)

Our invention relates to a railway signaling system of the coded track circuit type.

In an application for Letters Patent of the United States Serial No. 19,366, filed April 6, 1948, by Crawford E. Staples, which issued as Patent No. 2,561,956, on July 24, 1951, there is shown a normally deenergized coded track signaling system for single track railroads and arranged to be governed manually from a remote control office.

An object of our invention is to provide a system of the type described in this application and incorporating improved means for controlling the locks on hand-throw switches at intermediate points in the single track stretches.

Another object of the invention is to provide a system of the type described and incorporating switch lock control means which is arranged so that release of a switch lock is effected entirely from the switch and does not require performance of any function by the operator at the central office or by the code communication system.

A further object of the invention is to provide a system of the type described and incorporating means for preventing the energy supplied over the rails of a single track stretch as a part of the operation of unlocking a hand-throw switch from causing the improper display of a permissive indication by a head block signal.

Another object of the invention is to provide a system of the type described and incorporating improved means for governing the transmission of indication codes to control occupancy indication means at the office.

A further object of the invention is to provide improved switch lock control means which, when a switch is to be unlocked, operates automatically to supply impulses of actuating energy to the portions of the track stretch on both sides of the switch, and to repeat these impulses to the portion of the stretch on each side of the switch until operation of the coded track circuit equipment for that track portion has been initiated and to thereafter discontinue the supply of actuating impulses to that track portion.

Other objects of the invention and features of novelty will be apparent from the following description taken in connection with the accompanying drawings.

Figure 1A:
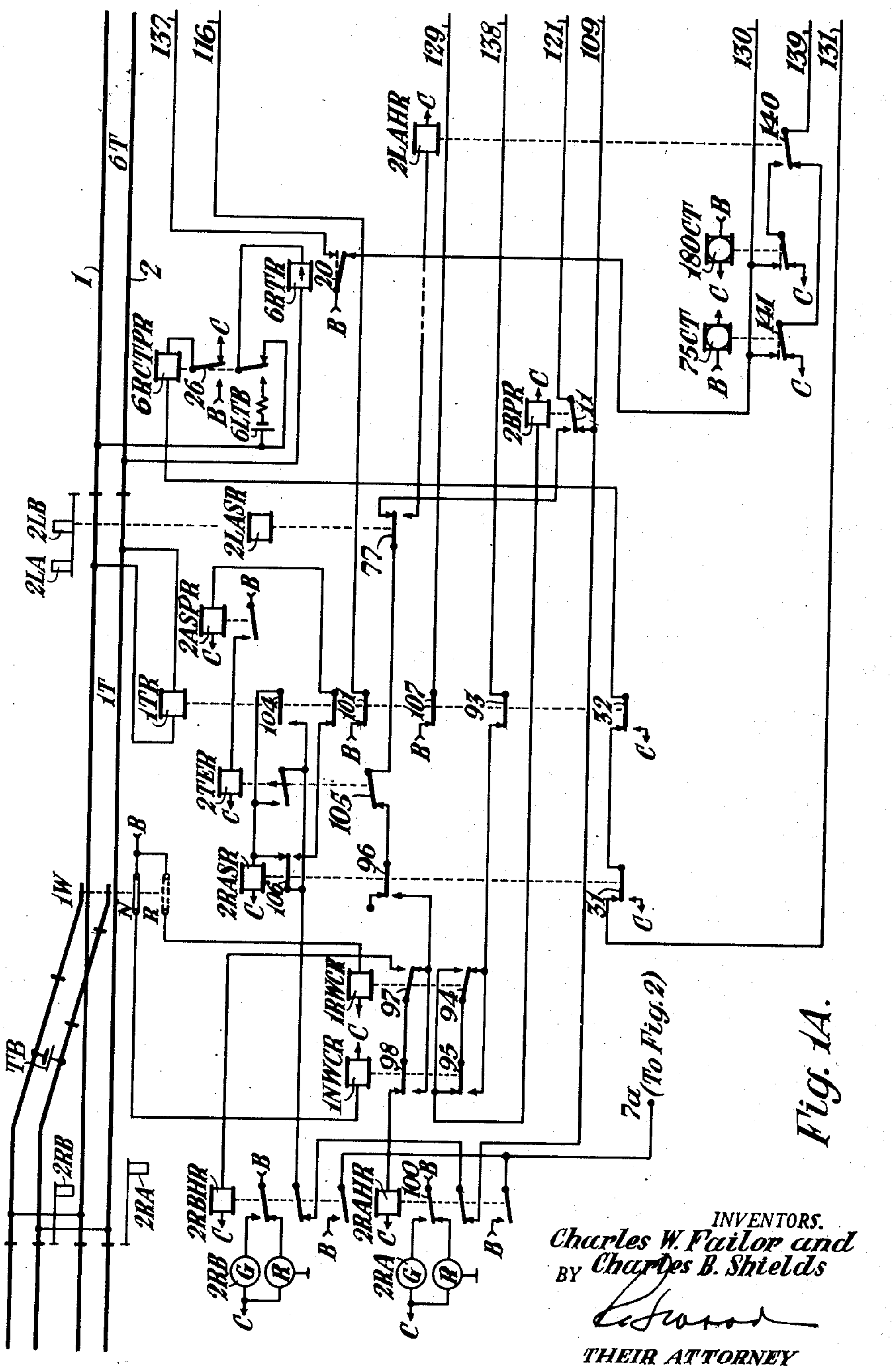
Figure 1B:
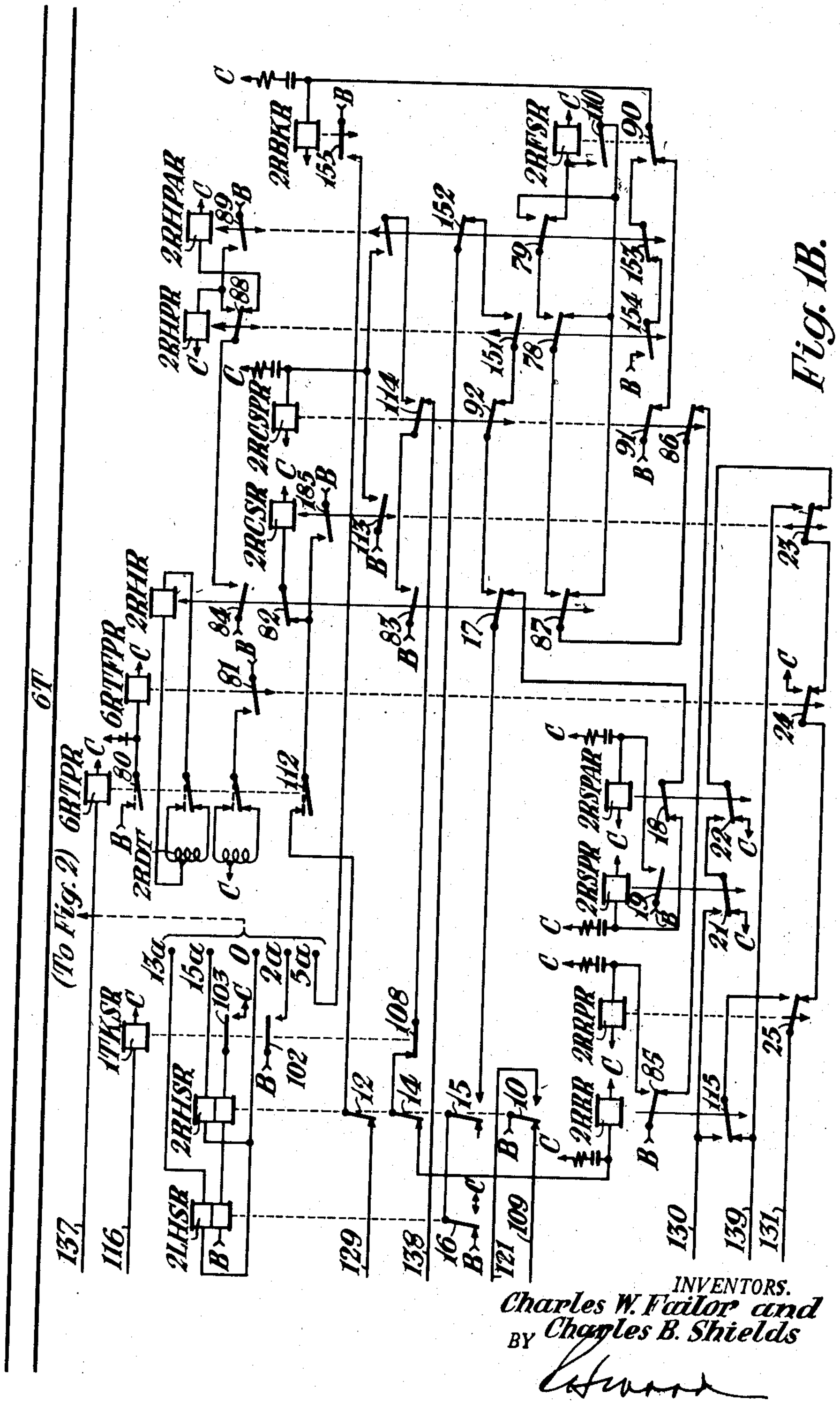
Figure 1C:
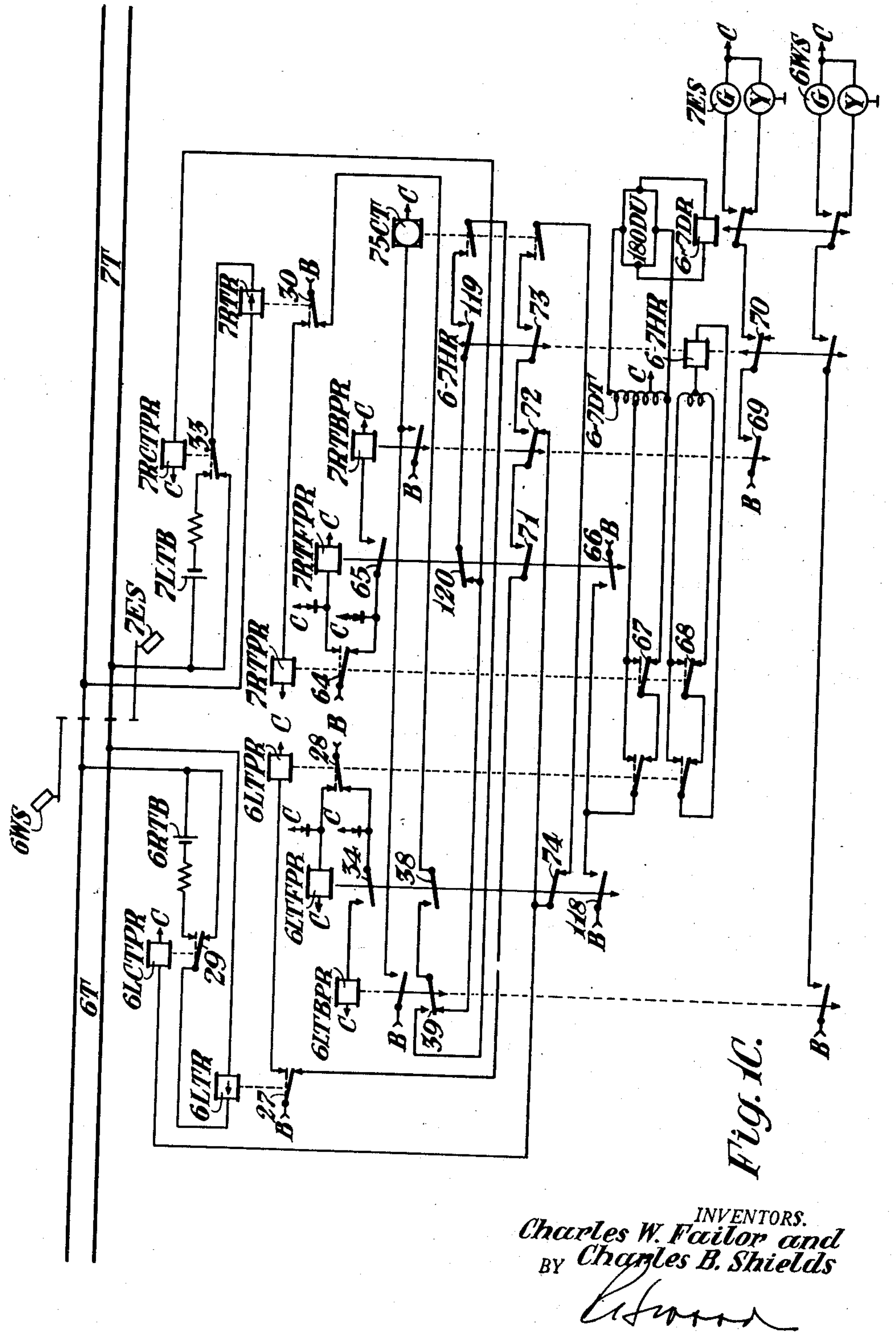
Figure 1D:
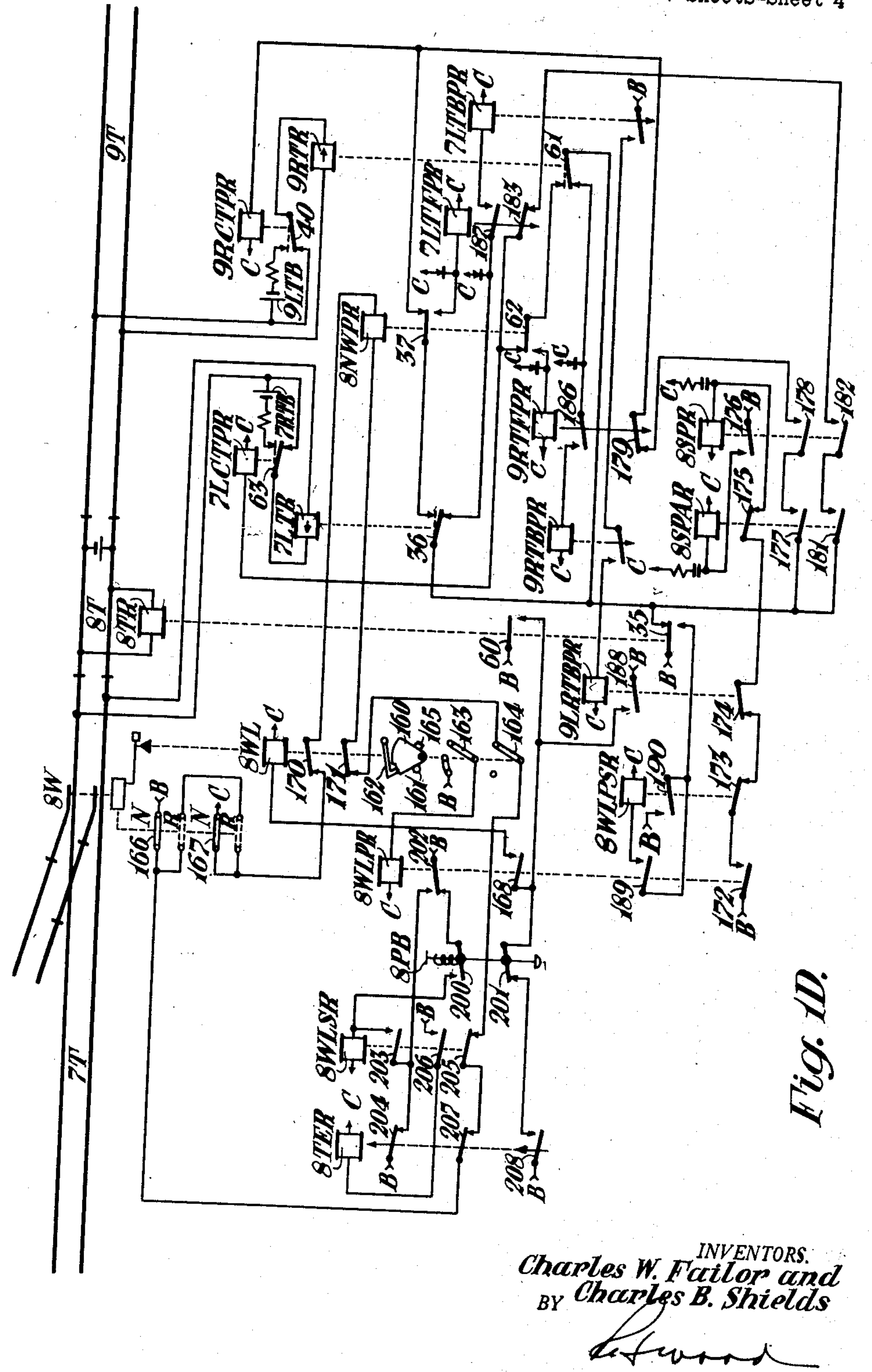
Figure 1E:
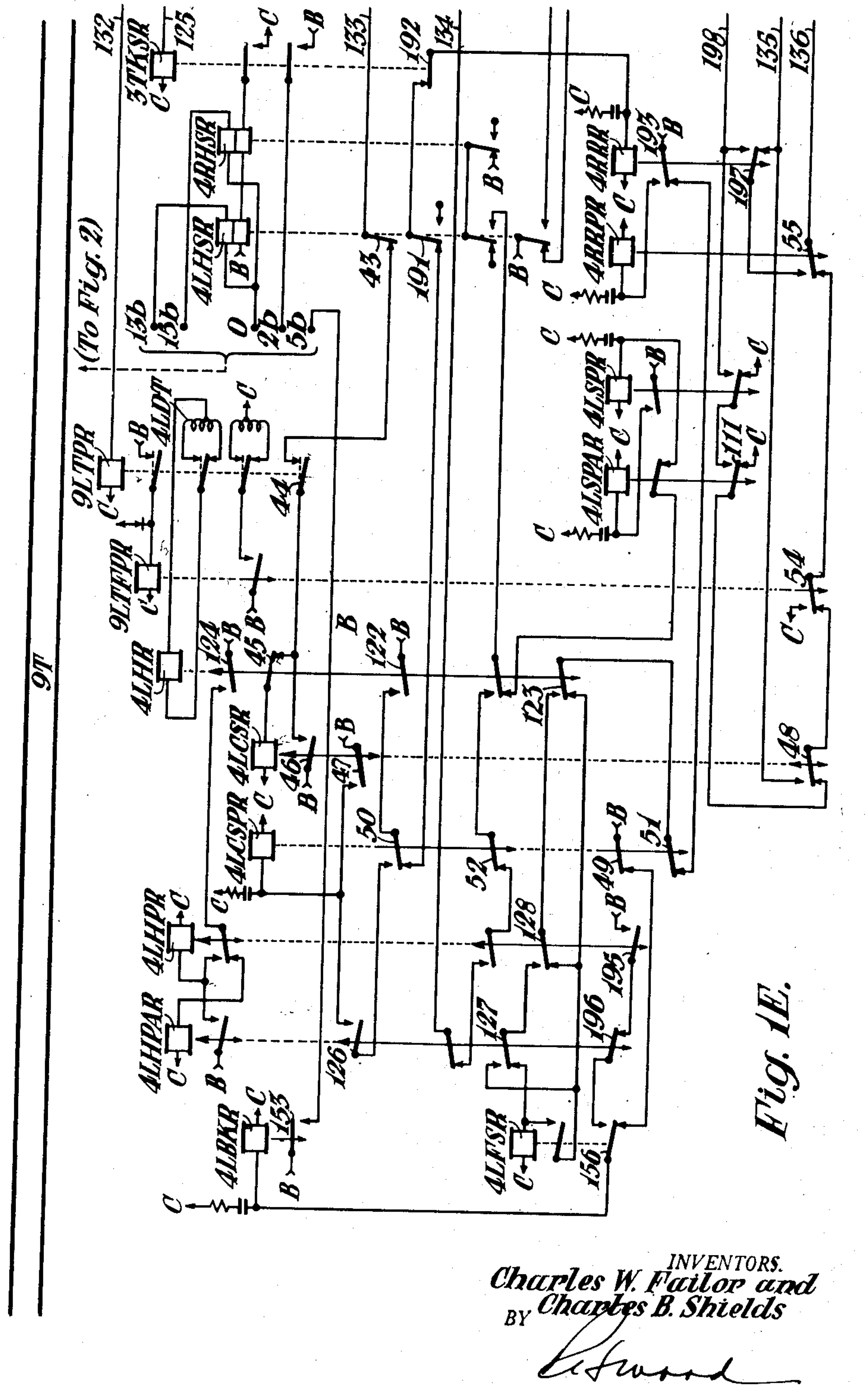
Figure 1F:
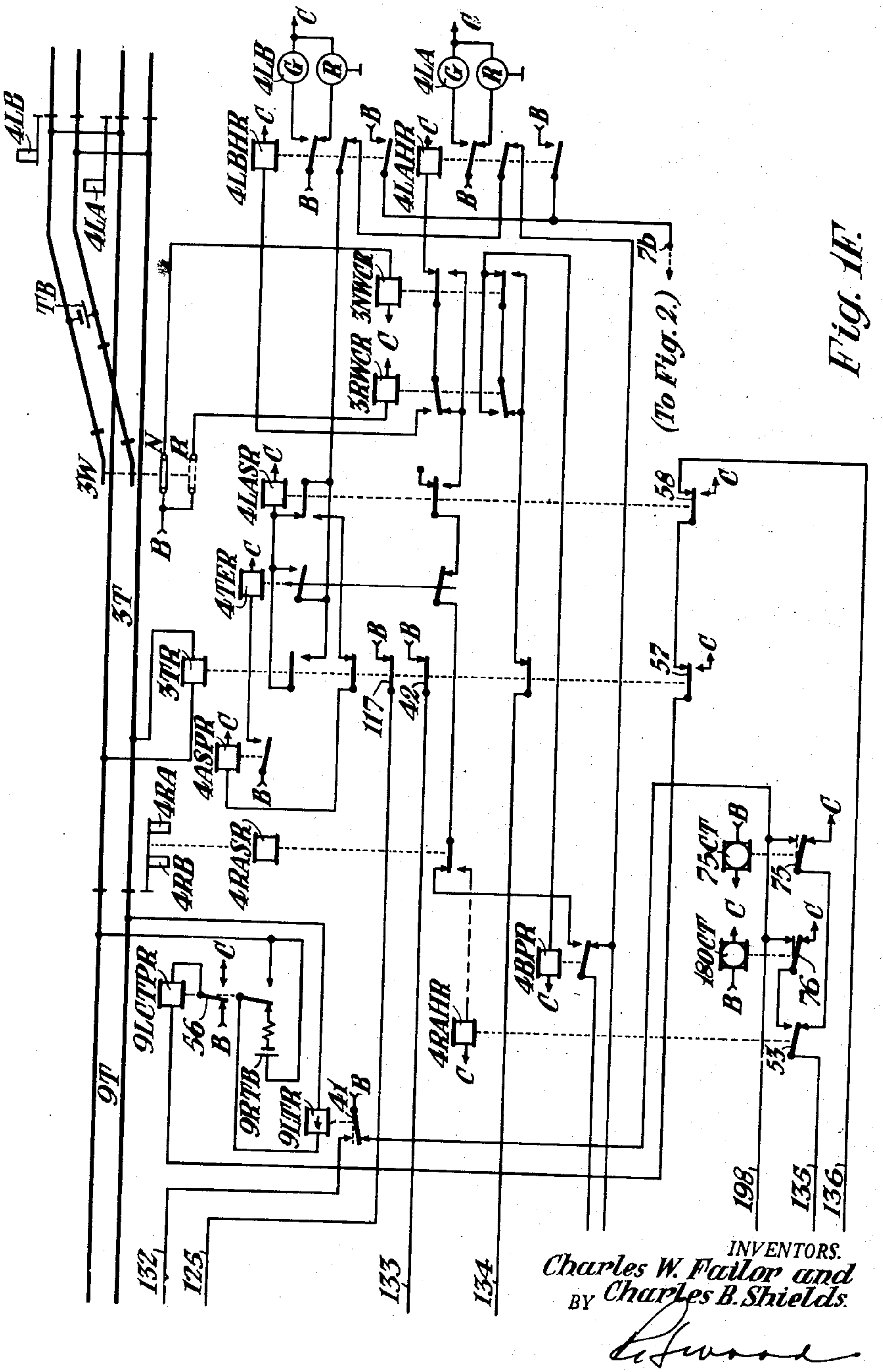
Figure 2:
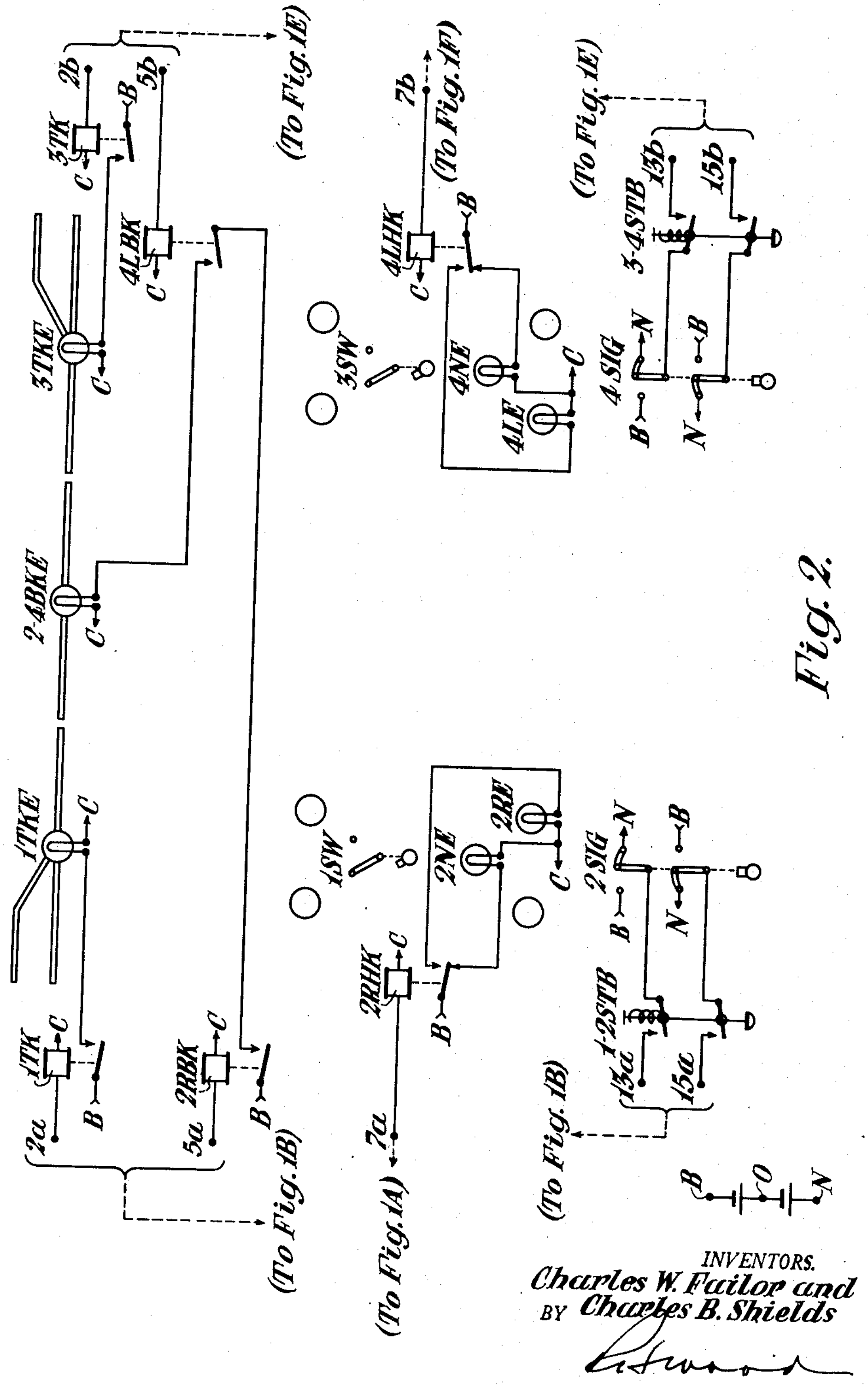

In the drawings, Figs. 1A, 1B, 1C, 1D, 1E and 1F, when placed together in the order named with Fig. 1A at the left form a diagram of a stretch of single track railway equipped with signaling apparatus embodying our invention, and Fig. 2 is a diagram of the operator's panel at the control office, including the circuits and apparatus employed in connection wtih the wayside apparatus shown in Figs. 1A, 1B, 1C, 1D, 1E and 1F.

We shall describe one form of railway signaling system embodying our invention, and shall then point out the novel features thereof in claims.

Similar reference characters refer to similar parts in each of the views, and similar relays at different locations are distinguished by different numerical prefixes and by the prefix L or R, designating the left or right direction. It is to be understood that when a relay is identified in the course of the description only by a letter combination such as HR, the description applies to each of the similar relays 2RHR, 4LHR, etc., shown on the drawings.

In practicing our invention we provide the single track stretch with a normally deenergized coded track circuit system employing apparatus arranged substantially as illustrated and described in the above-identified application of Crawford E. Staples. This track circuit system comprises a transmitter relay RCTPR or LCTPR at each end of each coded track circuit section which is operable between two positions to alternately connect a battery LTB or RTB or a code following track relay RTR or LTR across the rails of its section. Each code following track relay is provided with a code following track repeater relay RTPR or LTPR, which controls a slow release track repeater relay RTFPR or LTFPR, and at each signal location, also controls a code detector relay RHR or LHR for governing the adjacent signals. The code detector relays HR are controlled in such a manner that they are selectively responsive to the code operation of the associated track relays.

The coded track circuit system of the Staples application as employed herein is set into operation by energizing a stick relay LCSR or RCSR of the slow pick-up type, at the exit end of the block, for the desired traffic direction, which relay is designated the code sending relay and when energized initiates the code operation of the adjacent transmitter relay RCTPR or LCTPR by connecting its winding to the contacts of a code transmitter 75CT or 180CT, comprising a continuously operating relay of the pendulum type, identified conventionally on the drawings by a circle on the representation of its winding. The code transmitter contacts operate at the rate of 75 or 180 times per minute, respectively, and cause the transmitter relay to supply impulses of coded signaling energy of a corresponding frequency to the rails of its section. These impulses are repeated or cascaded over the rails of the various sections of the block and operate the code following track relays RTR or LTR and thereby energize the code detector relays HR at the intermediate signal locations and at the entrance end of the block.

The code sending relay LCSR or RCSR at the exit end of the block is picked up by the transmission of an "actuating code" over the track rails of the block in response to the operation, by remote control, from a central office, of a signal control relay at the entrance end of the block. This actuating code is generated by the cyclic operation of a pair of slow release actuating code relays SPR and SPAR and each cycle comprises an impulse of six seconds duration followed by an "off" period of equal duration. Normally the code sending relay at the exit end of the block picks up on the first cycle of actuating code and initiates the operation of the associated transmitter relay to supply coded signaling current to the rails, the reception of which at the entrance end stops further transmission of the actuating code.

The operation of the coded track circuit system is discontinued when the stretch is vacated, provided the signal control relay by which the system is set into operation has been restored to its normal condition, by the transmission of a "restoring code" over the rails of the stretch, from the entrance end.

The restoring code is generated by the cyclic operation of a pair of restoring code relays RRR or LRR and RRFR or LRPR and each cycle comprises a steady "on" period of six seconds duration followed by a succession of 75 code pulses for six seconds and terminating with an "off" period of six seconds. The effect of the initial steady current period is to over-ride the coded signaling current being transmitted from the exit end to stop its further transmission, and the effect of the 75 code portion is to pick up the code detector relay HR at the exit end of the block momentarily and thereby release the operated code sending relay CSR. This stops the transmission of coded signaling current from the exit end of the block, and this in turn stops the further transmission of the restoring code.

In accordance with one feature of our invention, the equipment at an outlying hand-throw switch is arranged so that during a preliminary part of the operation of unlocking a switch, impulses of actuating code energy are applied to the rails of the stretch on both sides of the switch, by actuating code relays SPR and SPAR at the switch location. These impulses are cascaded or repeated to the ends of the stretch. When the actuating code impulses are received at the ends of the stretch the code sending relays CSR are operated to cause coded energy to be supplied over the rails of the stretch toward the switch. When coded energy is received at the switch over the track rails of the track portions on both sides of the switch, a circuit is established for supplying energy to the winding of the switch lock to thereby release the lock.

In accordance with another feature of our invention, the equipment at each end of the stretch includes a slow pick-up, slow release repeater relay HPR and an auxiliary slow pick-up, slow release repeater relay HPAR for the code detector relay HR, which relays operate to permit the display of a proceed indication by the associated head block signal only after coded energy has been received at that end of the stretch to energize the code detector relay HR for a period longer than an impulse of actuating code energy to thereby prevent the improper display of a proceed indication by a head block signal in the event an impulse of actuating code energy is recurrently interrupted due to a fault and causes code following operation of the track relay at an end of the stretch.

In addition, a feature of our invention is the provision at each end of the stretch of a normally energized slow release block indication control relay such as the relay 2RBKR, Fig. 1B, which is controlled in accordance with the traffic direction set up, by a traffic relay such as the relay 2RFSR. Each of these relays BKR is governed so as to be released when the end of the stretch at which it is located is an exit end, as manifested by energization of the associated code sending relay CSR. Each of the block indication control relays BKR is also controlled so that when the end of the stretch at which it is located is an entrance end, as manifested by energization of the associated traffic relay FSR, the block indication relay will be released when the stretch is occupied, as manifested by release of the repeater HPR of the associated code detecting relay HR. These block indication control relays govern block indication relays 2RBK and 4LBK at the office as shown in Fig. 2, and these relays cooperate to cause the block indication lamp 2—4BKE for the single track stretch to be lighted to display the occupied indication when the block indication control relays at both ends of the stretch are deenergized.

Referring to Fig. 2 of the drawings there is shown therein a portion of the equipment and circuits in the control machine at the office, as well as a portion of the communication circuits which extend to field stations located at opposite ends of the single track stretch which is equipped with the signaling apparatus provided by this invention.

The office and field stations are connected over a pair of line wires, not shown, by a code communication system which may be of the type shown in Letters Patent of the United States No. 2,229,249, issued January 21, 1941, to Lloyd V. Lewis, or in Letters Patent of the United States No. 2,411,375, issued November 19, 1946, to Arthur P. Jackel and described in Manual 506A of The Union Switch and Signal Company.

Consideration of the detailed mode of operation of the code communication system is not needed for an understanding of this invention and it is deemed sufficient to point out that a field station is provided at each end of each track stretch to be controlled and that coding units are provided at the office and at each field station and are connected by a pair of line wires, not shown, over which control codes are transmitted at times from the office to a selected field station in response to the operation of starting buttons STB, and over which at other times indication codes are transmitted over the same line wires from the different field stations to the office without interference. Transmission of each code includes the temporary establishment of a plurality of communication channels, such, for example, as seven, between the office and a station to position a group of relays.

The explanation of this invention requires only two channels employed in the transmission of control codes for governing the signal control relays LHSR and RHSR, and three channels employed in the transmission of indication codes, for governing the indication relays TK, BK and HK of Fig. 2, and in order to simplify the disclosure these channels are represented herein by the equivalent direct wire connections, and the other channels and related apparatus have not been shown. The channels employed in the transmission of control codes from the office to the station at the left-hand end of the block, shown in Fig. 1B, are designated 13a and 15a, and the corresponding channels extending to the station at the right-hand end of the block shown in Fig. 1E, are designated 13b and 15b, while the channels employed in the transmission of indication codes from these stations to the office are designated 2a, 5a, and 7a, and 2b, 5b, and 7b, respectively.

The office and field stations are each provided with a suitable source of direct current such as a storage battery, not shown, the terminals of which are designated B and C in the drawings.

In order to simulate the code action by which the signal control relays LHSR and RHSR are controlled in practice, contacts of the starting buttons 1—2STB and 3—4STB by which the control codes are initiated are included directly in their circuits and the channels are supplied with energy by a separate battery having positive and negative terminals B and N and a middle terminal O as shown in Fig. 2. It is to be understood that these relays operate their contacts to the left when terminal B is applied to the left-hand terminal of the relay winding (or when terminal N is applied to the right-hand terminal) and operate their contacts to the right when these connections are interchanged, the relays remaining in their last operated positions when deenergized. Referring to Figs. 1A, 1B, 1C, 1D, 1E and 1F of the drawings, there is shown therein a stretch of single track railroad between the ends of two passing sidings. It is assumed that the track switches 1W and 3W at the ends of the passing sidings are power operated in the usual manner in response to the operation of the switch levers 1SW and 3SW of Fig. 2, as described in the remote control system patents hereinbefore referred to. The switch control circuits have not been shown for the reason that consideration of the mode of operation of the track switches at the ends of the block is not needed for an understanding of our invention, and it will suffice to point out that each such switch is provided with the usual normal and reverse switch indication relays NWCR and RWCR, which relays are governed by a contact N or R which is controlled in accordance with the position of the switch so that the contact establishes the circuit of one of the indication relays when and only when the switch is in the corresponding position and is locked in that position.

Entrance of traffic from left to right, that is, eastbound, into the stretch is governed by the head block signals 2RA and 2RB, while entrance of traffic moving from right to left, that is, westbound, into the stretch is governed by the head block signals 4LA and 4LB. Movement of eastbound and westbound traffic through the stretch is governed by the intermediate signals ES and WS. The signals may be of any suitable type and are here shown as being of the color light type. Each of the head block signals is capable of displaying either a red or stop indication, or a green or proceed indication by the lighting of a lamp R or G, while each of the intermediate signals is capable of displaying either a yellow or caution indication, or a green or clear indication by the lighting of a lamp Y or G. As shown, the head block signals are continuously lighted, while the lamps of the intermediate signals are controlled so that when the track stretch is prepared for traffic the lamps of the intermediate signal for the corresponding traffic direction are lighted. Although the signal lamps are shown as being continuously lighted, it should be understood that the lamp circuits may be governed in any manner well known in the art so that the lamps of a signal are lighted only on the approach of a train.

At each siding end is a detector track section, each of which includes the associated track switch, and each of which is provided with a track circuit employing steady energy and including a battery TB and a track relay TR.

The track relay TR for each detector track section is provided with a repeater relay TKSR which governs the corresponding track indication relay TK at the office to light the lamp TKE in the track diagram when the section is occupied, and by energizing the lower windings of relays RHSR and LHSR restores the operated relay to normal when a train enters the block.

The head block signals are interlocked with the associated track switch and with all opposing signals for the block by conventional "relay interlocking" circuits, of which only those portions needed for an understanding of our invention are shown. These include the signal relays RAHR, RBHR, LAHR and LBHR for controlling the aspects displayed by the signals, an approach locking relay RASR or LASR for each group of signals, a time element relay TER controlled by a back contact repeater relay ASPR for the approach locking relays and a block repeater relay BPR.

Each approach locking relay must occupy its energized position to enable the associated track switch to be operated or to enable any of the opposing signals for the block to be cleared, and must be released to enable one of the associated signals to be cleared. The release of the approach locking relay is accomplished by energizing the block repeater relay BPR, which relay picks up when the signal control relay RHSR or LHSR is reversed and the route governed by the signal selected for clearing is available. The approach locking relay which has been released is re-energized either when the signal is put to stop by the passage of a train, or at the end of an appropriate time interval imposed by the operation of relay TER, following the manual return of a signal to stop.

The signal relays above referred to also govern signal indication relays HK at the office in such manner as to repeat the signal aspects by lighting a red lamp 2NE or 4NE above the signal lever when the corresponding signals are at stop, and by lighting a green lamp 2RE or 4LE when one of these signals is cleared.

The track rails 1 and 2 of the main track portion are divided into a plurality of track sections. As shown, these include a section 6T which extends from the detector track section 1T at the left-hand or west end of the stretch to the intermediate signals. The portion of the main track stretch between the intermediate signals and the right-hand end of the stretch is divided into sections 7T, 8T, and 9T. The section 8T is located immediately in advance of a hand-throw switch 8W which leads to a siding or branch track. The section 8T is provided with a track circuit employing steady energy and including a track relay 8TR. The switch 8W is normally locked in its normal position and may be moved therefrom when and only when the switch lock 8WL is energized, while the supply of energy to the winding of the lock 8WL is governed by the track circuit apparatus of the track sections in the main track, and by a time element relay 8TER, so that the switch can be unlocked only when it is safe for it to be moved.

The outlying track switch 8W is interlocked with the block signaling system by a switch repeating relay or indication relay 8NWPR, which relay is energized only when the switch and the electric switch lock 8WL are properly locked in the normal position as required for through traffic movements.

Each of the track sections 6T, 7T, and 9T is provided with two sets of coded track circuit apparatus, one for each direction of traffic.

As shown, the equipment is in its normal condition in which the head block signals are at stop, and in which the coded track circuit apparatus for both directions of traffic is deenergized so that both intermediate signals are dark.

As shown, the track switches are assumed to be closed and locked normal, and consequently the normal switch indication relays 1NWCR and 3NWCR are energized, and the indication relay 8NWPR for the outlying track switch 8W is also energized.

The approach locking relays RASR and LASR are also normally energized over stick circuits. The circuit for relay 2RASR extends from terminal B over the normal contact 10 of relay 2RHSR, Fig. 1B, to wire 109 or over the reverse contact 10, wire 121 and back contact 11 of relay 2BPR and thence over back contacts of the signal relays 2RAHR and 2RBHR, and contact 106 and the winding of relay 2RASR to terminal C. Consideration of the circuits of the remaining approach locking relays is not needed for an understanding of our invention and these may be assumed to be held energized over circuits similar to the one just traced.

At this time the block indication control relays 2RBKR and 4LBKR at the ends of the stretch are both energized and interrupt the circuits leading to channels 5a and 5b of the associated field station units so that the block indication relays 2RBK and 4LBK at the office, shown in Fig. 2, are released and extinguish the block indication lamp 2—4BKE.

Since the signal relays for the head block signals are released, these signals are at stop and channels 7a and 7b are open, and the signal indication relays 2RHK and 4LHK at the office are released with the result that they establish the circuits for lighting the stop signal indication lamps 2NE and 4NE and interrupt the circuits of the clear signal indication lamps 2RE and 4LE.

In addition, the track relays 1TR and 3TR for the detector track sections are picked up and their repeater relays 1TKSR and 3TKSR are energized over contact 101 and wire 116, and over contact 117 and wire 125, respectively, so that channels 2a and 2b are open and the detector section indication relays 1TK and 3TK at the office are released and extinguish the detector section indication lamps 1TKE and 3TKE.

If the operator wishes to prepare the stretch for traffic in either direction, he may do so by positioning the signal lever for the signal at the corresponding entrance end of the stretch and transmitting a control code to clear that signal. For purposes of illustration it will be assumed that the operator desires to prepare the stretch for an eastbound train. In order to do so he moves the lever 2SIG, Fig. 2, to the right and presses the associated starting button 1—2STB. As lever 2SIG is in its right-hand position the pressing of button 1—2STB establishes a circuit from terminal B over channel 15a through the upper winding of the polar signal control relay 2RHSR from right to left to terminal O and its contacts move to their right-hand or reverse position.

At the same time, relay 2LHSR is energized in the opposite direction so that its contacts remain in their left-hand position as shown.

On this movement of the contacts of signal control relay 2RHSR, its contact 10, Fig. 1B, interrupts the circuit over wire 109 for energizing the locking approach relay 2RASR and establishes a circuit including wire 121 and back contact 11 of relay 2BPR for supplying energy to relay 2RASR so relay 2RASR remains picked up and maintains its own stick circuit. In addition, on this movement of the contacts of relay 2RHSR, its contact 12 interrupts the circuit including wire 129 for the code sending relay 2RCSR to thereby prevent picking up of the contacts of this relay on subsequent operation of the track repeater relay 6RTPR.

Furthermore, on movement of the contacts of relay 2RHSR to their reverse position, contact 14 interrupts the circuit of the restoring code relay 2RRR to prevent energization of this relay on subsequent energization of the code detector relay 2RHR.

On movement of the contacts of relay 2RHSR to their reverse position, contact 15 establishes a circuit including normal polar contact 16 of relay 2LHSR for supplying energy over back contact 17 of relay 2RHR, and back contact 18 of relay 2RSPAR to the actuating impulse code generating relay 2RSPR. Accordingly, the contacts of relay 2RSPR pick up and its contact 19 establishes the circuit for its repeating relay 2RSPAR with the result that it contacts pick up and contact 18 interrupts the circuit of relay 2RSPR. The relay 2RSPR is snubbed by a condenser which is of such size that, after the supply of energy to the relay winding and to the associated condenser is interrupted, the contacts of relay 2RSPR remain picked up for a substantial time interval, such as 6 seconds. Accordingly, after relay 2RSPAR picks up, the contacts of relay 2RSPR remain picked up and maintain the circuit of the relay 2RSPAR for a considerable time interval. The relay 2RSPAR is also snubbed by a condenser which is of such size as to maintain the relay contacts picked up for approximately 6 seconds after the supply of energy to the relay winding and to the associated condenser is interrupted.

As a result, on the supply of energy to relay 2RSPR, its contacts pick up and establish the circuit of relay 2RSPAR so that its contacts pick up to interrupt the supply of energy to relay 2RSPR. Thereafter, the relay 2RSPR remains picked up for approximately 6 seconds and maintains the supply of energy to relay 2RSPAR so that the release time of relay 2RSPAR does not start until relay 2RSPR releases, while the relay 2RSPAR does not release until about 6 seconds subsequent to release of relay 2RSPR.

When the relays 2RSPAR and 2RSPR are both picked up, a circuit is established for supplying energy to the transmitter relay 6RCTPR in Fig. 1A. This circuit is traced from terminal B of the local source of energy over back contact 20 of relay 6RTR, wire 130, front contact 21 of relay 2RSPR, front contact 22 of relay 2RSPAR, back contact 23 of relay 2RCSR, back contact 24 of relay 6RTFPR, back contact 25 of relay 2RRPR, wire 131, front contact 31 of relay 2RASR, and front contact 32 of relay 1TR to the left-hand terminal of the winding of relay 6RCTPR. The relay 6RCTPR is a polar stick relay the contacts of which are moved to one position or the other depending on the polarity of the energy supplied to the relay winding. In addition, the relay contacts remain in their last operated position when the supply of energy to the relay winding is cut off. As shown, the contacts of relay 6RCTPR are in their right-hand or reverse position in which contact 26 connects the right-hand terminal of the relay winding to terminal C of the source. Accordingly, on completion of the circuit for connecting terminal B of the source to the left-hand terminal of the relay winding, energy flows through the relay winding from the left to the right-hand terminal and causes the relay contacts to move to their left-hand or normal position. On movement of contact 26 away from its reverse position, the circuit of the relay winding is interrupted but the construction of the relay is such that the relay contacts continue their movement to their normal position. When the relay contacts complete their movement to their normal position, the right-hand terminal of the relay winding is connected to terminal B of the source, and, since both terminals of the relay winding are connected to terminal B of the source, energy ceases to flow in the relay winding and the relay contacts remain in their normal position.

When the contacts of relay 6RCTPR are in their normal position, the track battery 6LTB is connected across the rails of section 6T in series with the winding of relay 6RTR. Each code following track relay RTR or LTR is of the polar biased neutral type, the contacts of which pick up only in response to energy of a selected polarity as indicated by an arrow on the drawings, and the equipment is arranged so that the polarity of the energy supplied to the relay winding from the adjacent battery LTB or RTB is of the wrong polarity to pick up the relay contacts.

The energy supplied from battery 6LTB to the rails of section 6T feeds over back contact 29 of transmitter relay 6LCTPR to the winding of track relay 6LTR, Fig. 1C, and picks up its contact 27 to supply energy to the repeater relay 6LTPR so that its contacts pick up and energy is supplied over its front contact 28 to the slow release front contact repeater relay 6LTFPR.

When relay 6LTFPR picks up, energy is supplied to the transmitter relay 7RCTPR over the circuit which includes back contact 30 of the track relay 7RTR, front contact 38 of relay 6LTFPR, and back contact 39 of a slow release code detector relay 6LTBPR so the contacts of relay 7RCTPR pick up and connect track battery 7LTB across the rails of section 7T in series with the winding of relay 7RTR. The energy supplied to the left-hand end of the rails of section 7T feeds to track relay 7LTR, Fig. 1D, and picks up the relay contact 36 with the result that energy is supplied from terminal B over front contact 35 of relay 8TR, front contact 36 of relay 7LTR, and front contact 37 of relay 8NWPR to the transmitter relay 9RCTPR and its contact 40 picks up to connect the track battery 9LTB across the section rails in series with the winding of track relay 9RTR.

The energy supplied from the battery 9LTB to the left-hand end of the rails of section 9T feeds over reverse polar contacts of the transmitter relay 9LCTPR to the winding of relay 9LTR, Fig. 1F, and picks up its contact 41 so that energy is supplied over wire 132 to the repeater relay 9LTPR and its contacts pick up. When relay 9LTPR picks up one of its contacts establishes an obvious circuit for energizing the slow release relay 9LTFPR. In addition, when the contacts of relay 9LTPR pick up, energy is supplied from terminal B over front contact 42 of relay 3TR, wire 133, normal polar contact 43 of relay 4LHSR, front contact 44 of relay 9LTPR, and back contact 45 of relay 4LHR to the code sending relay 4LCSR. The relay 4LCSR is of a type the contacts of which are slow to pick up and slow to release. As hereinafter explained the supply of energy to relay 4LCSR is maintained for a substantial time interval so the relay contacts pick up and its contact 46 establishes the relay stick circuit which includes back contact 45 of relay 4LHR. In addition, when relay 4LCSR picks up, its contact 47 establishes the circuit of a slow release repeater relay 4LCSPR and its contacts pick up. Furthermore, when relay 4LCSR picks up, a circuit is prepared over its front contact 48, as hereinafter described, for supplying coded energy to relay 9LCTPR on release of relays 9LTR and 9LTFPR.

When relay 4LCSPR picks up, its contact 50 interrupts the circuit for supplying energy to the restoring code relay 4RRR so it is certain to remain released and prevent energization of its repeater relay 4RRPR, in the event relay 4LHR picks up and closes its contact 122 in that circuit, while contact 51 of relay 4LCSPR interrupts the pick-up circuit for the traffic relay 4LFSR which extends from terminal B at back contact 193 of relay 4RRR and includes the open front contact 123 of relay 4LHR, so that relay 4LFSR is certain to remain released.

When relay 4LCSPR picks up, its contact 49 interrupts the circuit of relay 4LBKR. When relay 4LBKR releases, its contact 153 connects terminal B of the source to channel 5b and picks up relay 4LBK.

Furthermore, at this time, as relay 4LCSPR is picked up, its contact 52 interrupts the circuit including wire 134 for supplying energy to the relay 4BPR and thereby insures that it remains released at this time and prevents interruption of the circuit of relay 4LASR.

As explained above, when relay 2RHSR, Fig. 1A, is reversed, the actuating impulse generating relays 2RSPR and 2RSPAR are picked up and supply energy to relay 6RCTPR to move its contacts to their normal position in which actuating code energy is supplied from the track battery 6LTB to the rails of section 6T with the result that energy is supplied to each of the other sections in the track stretch. The supply of energy from battery 6LTB to the rails of section 6T, as well as from the other track batteries to the rails of the associated sections, is maintained as long as the contacts of relay 6RCTPR remain in their left-hand or normal position. In addition, as explained above, the relay 2RSPR, when picked up, remains picked up for a substantial time interval such as 6 seconds, and as long as relay 2RSPR is picked up the circuit for connecting terminal B of the source to the left-hand terminal of the winding of relay 6RCTPR is maintained and the contacts of relay 6RCTPR remain in their left-hand or normal position.

Accordingly, actuating code energy is supplied over the rails of the track stretch for a period substantially equal to the length of the picked-up period of relay 2RSPR, and the contacts of relay 9LTR, Fig. 1F, are maintained picked up long enough to cause relay 9LTPR to establish the pick-up circuit for relay 4LCSR for a period sufficient to insure that the relay contacts pick up. The closing of contact 46 completes a stick circuit by which relay 4LCSR is held energized until the system is to be restored to its inactive condition, at which time relay 4RHR is operated by a restoring code to release relay 4LCSR, by opening contact 45.

After the expiration of the release time of relay 2RSPR, its contacts release with the result that contact 19 interrupts the circuit of relay 2RSPAR, but, as explained above, the contacts of relay 2RSPAR remain picked up for a substantial time interval and contact 18 interrupts the circuit of relay 2RSPR. In addition, on release of relay 2RSPR, its contact 21 interrupts the previously traced circuit for connecting the left-hand terminal of the winding of relay 6RCTPR to terminal B of the source and this terminal of the winding of relay 6RCTPR is now connected to terminal C of the source. As the contacts of relay 6RCTPR are in their left-hand or normal position, contact 26 connects the right-hand terminal of the relay winding to terminal B of the source, and when the left-hand terminal of the relay winding is connected to terminal C of the source, energy flows through the relay winding in the direction to cause the relay contacts to move to their right-hand or reverse position so that contact 26 transfers the right-hand terminal of the relay winding from terminal B to terminal C of the source, thereby interrupting the flow of energy through the relay winding. However, the relay contacts, after movement to their reverse position, remain in that position.

On this movement of the contacts of relay 6RCTPR, the circuit for supplying energy from the battery 6LTB to the rails of section 6T is interrupted and the relay 6RTR is connected across the track rails.

When the supply of energy to the left-hand end of the rails of section 6T is interrupted, the relay 6LTR, Fig. 1C, releases and its contact 27 interrupts the circuit of the repeater relay 6LTPR with the result that it releases and its contact 28 interrupts the circuit of the slow release relay 6LTFP and closes a circuit over contact 34 of relay 6LTFPR for the slow release code detector relay 6LTBPR, which picks up and its back contact 39 interrupts the previously traced circuit for supplying energy to the transmitter relay 7RCTPR. After a short time interval, relay 6LTFPR releases and its contact 34 opens to release relay 6LTBPR, but relay 7RCTPR remains released due to the opening of contact 38 of relay 6LTFPR. Accordingly, the relay 7LTR, Fig. 1D, releases and its contact 36 interrupts the circuit for supplying energy to relay 9RCTPR and its contact 40 releases to interrupt the circuit for supplying energy from battery 9LTB to the rails of section 9T.

After release of relay 9RCTPR, the relay 9LTR, Fig. 1F releases and its contact 41 interrupts the circuit of relay 9LTPR so that its contacts release with the result that contact 44 interrupts the pick-up circuit for relay 4LCSR. However, at this time the relay 4LCSR is energized by current supplied over its stick circuit so the relay contacts remain picked up after release of relay 9LTPR.

Furthermore, when relay 9LTPR releases, one of its contacts interrupts the circuit of relay 9LTFPR so that its contacts release after a short time interval.

When relays 9LTR and 9LTFPR release, a circuit is completed for supplying coded energy to the transmitter relay 9LCTPR and is traced from terminal B over back contact 41 of relay 9LTR, over front contact 75 or 76 of the code transmitter 75CT or 180CT, contact 53 of the signal relay 4RAHR, for signal 4RA, wire 135, front contact 48 of code sending relay 4LCSR, over back contact 54 of relay 9LTFPR, back contact 55 of relay 4RRPR, wire 136 front contact 58 of relay 4LASR, and over front contact 57 of relay 3TR to the left-hand terminal of the winding of transmitter relay 9LCTPR. At this time the right-hand terminal of the winding of relay 9LCTPR is connected over reverse polar contact 56 of the relay to terminal C of the source. Accordingly, during the picked-up periods of contact 75 or 76 of the code transmitter 75CT or 180CT, energy is supplied to the relay RLCTPR to move the relay contacts to their normal position, thereby interrupting the supply of energy to the relay winding. On subsequent movement of contact 75 or 76 of the code transmitter 75CT or 180CT to its released position, and consequent connection of the circuit leading from the left-hand terminal of the winding of relay 9LCTPR to terminal C of the source, energy is supplied to the winding of relay 9LCTPR and is of the polarity effective to move the contacts of the relay to their reverse position. It will be seen, therefore, that after release of relays 9LTR and 9LTFPR the transmitter relay 9LCTPR is governed by one of the code transmitters and the contacts of relay 9LCTPR are operated between their reverse and normal positions at the rate determined by the code transmitter. On movement of the contacts of relay 9LCTPR to their left-hand or normal position, a circuit is established to connect the track battery 9RTB across the rails of section 9T in series with the winding of relay 9LTR.

On the supply of energy from battery 9RTB to the rails of section 9T, this energy feeds over back contact 40 of relay 9RCTPR to the track relay 9RTR, Fig. 1D, and picks up the relay contacts with the result that energy is supplied over front contact 35 of relay 8TR, front contact 61 of relay 9RTR, and front contact 62 of relay 8NWPR to the transmitter relay 7LCTPR and its contact 63 picks up to establish a circuit for connecting the track battery 7RTB across the rails of section 7T in series with the track relay 7LTR.

The energy supplied from battery 7RTB to the rails of section 7T feeds over back contact 33 of relay 7RCTPR to relay 7RTR, Fig. 1C, and picks up its contact 30 so that energy is supplied to the repeater relay 7RTPR and its contact 64 establishes the circuit of relay 7RTFPR.

During the periods in which the contacts of relay 9LCTPR are in their right-hand or reverse position, the supply of energy from battery 9RTB is interrupted and the relay 9RTR releases so that contact 61 interrupts the circuit of relay 7LCTPR and it releases with the result that contact 63 interrupts the circuit of battery 7RTB. Accordingly, relay 7RTR releases and contact 30 interrupts the circuit of relay 7RTPR so that its contact 64 releases to interrupt the circuit of relay 7RTFPR and establish a circuit including front contact 65 of relay 7RTFPR for supplying energy to the slow release code detector relay 7RTBPR. The relays 7RTFPR and 7RTBPR, as well as the corresponding similarly designated relays, are snubbed by rectifiers so that each is slow enough in releasing to remain picked up during the periods in which the supply of energy to the relay winding is interrupted. Accordingly, these relays remain picked up as long as the associated track relay is responding to coded energy.

When relay 7RTFPR picks up, its contact 66 establishes the circuit governed by contact 67 of relay 7RTPR for supplying energy to the primary winding of the decoding transformer 6—7DT, and on continued operation of relay 7RTPR its contact 68 rectifies energy induced in a secondary winding of the transformer and supplies this energy to the winding of the code detector relay 6—7HR and its contacts pick up. A second code detector relay 6—7DR is provided at this location which is connected to the decoding transformer through a resonant decoding unit 180DU, of the type disclosed in Letters Patent of the United States No. 1,773,472, granted August 19, 1930 to P. N. Bossart. As a result of operation of relay 7RTPR energy from the decoding transformer is supplied to relay 6—7DR that is of sufficient value to pick up the relay contacts only when the relay 7RTPR is operated by energy of 180 code frequency.

When relay 7RTBPR picks up, its contact 69 in the circuit of the lamps of signal 7ES is closed so that energy is supplied over front contact 70 of relay 6—7HR to the yellow or the green lamp of this signal depending on whether or not relay 6—7DR is released or picked up. In addition, when relay 7RTBPR picks up one of its contacts establishes a circuit for energizing the code transmitter 75CT at this location.

When relay 6—7HR picks up, a circuit is completed for supplying coded energy to transmitter relay 6LCTPR and includes back contact 27 of relay 6LTR, front contact 71 of relay 7RTFPR, front contact 72 of relay 7RTBPR, front contact 73 of relay 6—7HR, a contact of the code transmitter 75CT, and back contact 74 of relay 6LTFPR. Accordingly, the transmitter relay 6LCTPR is operated by energy of 75 code frequency and causes energy of this frequency to be supplied from the battery 6RTB to the rails of section 6T. This energy feeds over reverse polar contacts of relay 6RCTPR to the track relay 6RTR and operates it so that during the picked-up periods of contact 20 energy is supplied over wire 137 to relay 6RTPR. Accordingly, the contacts of relay 6RTPR pick up and release with the result that energy is supplied over its front contact 80 to the slow release repeater relay 6RTFPR to pick up its contacts.

When relay 6RTFPR picks up, its contact 81 establishes the circuit governed by a contact of relay 6RTPR for supplying energy to the primary winding of the decoding transformer 2RDT so that on continued code following operation of relay 6RTPR energy is induced in the transformer secondary winding, is rectified by a contact of relay 6RTPR, and is supplied to the code detector relay 2RHR.

In addition, when relay 6RTFPR picks up, its contact 24 connects the wire leading from the left-hand terminal of the winding of relay 6RCTPR to terminal C of the source to thereby insure that the contacts of relay 6RCTPR remain in their right-hand or reverse position and maintain the circuit of relay 6RTR.

When relay 2RHR picks up, its contact 17 interrupts the previously traced circuit for supplying energy to the actuating code relay 2RSPR to thereby prevent picking up of the contacts of this relay on expiration of the release time of the relay 2RSPAR and consequent release of the relay contacts.

In addition, when relay 2RHR picks up, its contact 82 interrupts the pick-up circuit for relay 2RCSR and insures that this relay remains released and does not establish the circuit for its repeater relay 2RCSPR.

When relay 2RHR picks up, its contact 84 establishes the circuit including back contact 88 of relay 2RHPR for supplying energy to its slow pick-up slow release auxiliary repeater relay 2RHPAR and its contacts pick up, so that contact 89 establishes the pick-up circuit for its slow pick-up slow release repeater relay 2RHPR. Accordingly, relay 2RHPR picks up and its contact 88 interrupts the circuit of relay 2RHPAR and establishes the stick circuit for relay 2RHPR so that relay 2RHPR remains picked up after relay 2RHPAR releases.

After release of relay 2RHPAR energy is supplied over normal polar contact 16 of relay 2LHSR, reverse polar contact 15 of relay 2RHSR, front contact 17 of relay 2RHR, back contact 92 of relay 2RCSPR, front contact 151 of relay 2RHPR, back contact 152 of relay 2RHPAR, wire 138, front contact 93 of relay 1TR, back contact 94 of relay 1RWCR, and front contact 95 of relay 1NWCR to the relay 2BPR and it picks up. When relay 2BPR picks up, its contact 11 interrupts the stick circuit of relay 2RASR and its contacts release so that energy is supplied over reverse polar contact 10 of relay 2RHSR, wire 121, front contact 11 of relay 2BPR, a front contact 77 of relay 2LASR, a back contact 105 of relay 2TER, back contact 96 of relay 2RASR, back contact 97 of relay 1RWCR, and front contact 98 of relay 1NWCR to the relay 2RAHR and its contacts pick up so that contact 100 interrupts the circuit of the red lamp of signal 2RA and establishes the circuit of the green lamp of this signal. The relay 2LASR, a contact 77 of which is included in the circuit of relay 2RAHR, is the approach locking relay for signals 2LA and 2LB, and is governed over circuits similar to those for relay 2RASR so as to be picked up when and only when the signals 2LA and 2LB are properly at stop.

From the foregoing it will be seen that the signal 2RA is not cleared until relay 2BPR picks up and that the circuit of relay 2BPR is complete only when relays 2RHR and 2RHPR are picked up, and when, in addition, relay 2RHPAR is released. The relay 2RHR does not pick up until after the contacts of the relay 6RTR have picked up more than once, while the operating characteristics of the relays 2RHPR and 2RHPAR are such that the contacts of each of these relays do not become picked up until after energy has been supplied to the relay winding for an appreciable time interval. Hence relay 2RHPAR does not pick up to establish the circuit of relay 2RHPR until after relay 2RHR has been picked up for a short time. Similarly, the relay 2RHPR does not pick up to interrupt the circuit of relay 2RHPAR until the relay 2RHPAR as been picked up for an appreciable time interval. Hence the release time of relay 2RHPAR does not start until a substantial time after relay 2RHR picks up. The relay 2RHPAR is of a type the contacts of which are slow to release so a substantial time interval elapses between the time at which relay 2RHPR picks up to interrupt the circuit of relay 2RHPAR and the time at which the contacts of relay 2RHPAR complete their movement to their released position and thereby complete the circuit of relay 2BPR. From this analysis of the operation of the equipment it will be seen that after the start of code following operation of relay 6RTR, the circuit of the relay 2BPR is not established for a time interval equal to the sum of the pick-up times of the relays 2RHR, 2RHPAR and 2RHPR, plus the release time of relay 2RHPAR. The various parts of the equipment are arranged and proportioned so that this time exceeds the longest period during which steady energy is supplied to relay 6RTR. Accordingly, if the steady energy supplied to relay 6RTR is coded or recurrently interrupted, due to a fault,, it cannot result in improper clearing of a signal since the supply of energy to the relay 6RTR will cease, and the relay 2RHR will release, before the circuit of the relay 2BPR has been established. Under these conditions, therefore, the relay 2BPR will remain released and hold signal 2RA at stop.

When relay 2RHR picks up, its contact 83 in the circuit for supplying energy to relay 2RRR is closed, but at this time this circuit is open at contact 14 of relay 2RHSR so the relay 2RRR remains released. After relay 2RHR has been picked up long enough for relay 2RHPR to become picked up and for relay 2RHPAR to become released, energy is supplied over back contact 85 of relay 2RRR, back contact 86 of relay 2RCSPR, front contact 87 of relay 2RHR, front contact 78 of relay 2RHPR, and back contact 79 of relay 2RHPAR to the traffic relay 2RFSR and its contacts pick up. When relay 2RFSR picks up, its contact 90 transfers the circuit of relay 2RBKR from the connection including back contact 91 of relay 2RCSPR to the connection including back contact 153 of relay 2RHPAR and front contact 154 of relay 2RHPR. Hence relay 2RBKR remains energized and its contact 155 continues to interrupt the connection from terminal B to channel 5*a*.

In addition, when relay 2RFSR picks up, its contact 110 in the relay stick circuit is closed.

When coded energy is received at the entrance end of the stretch and one of the signals 2RA or 2RB is cleared, a contact of the corresponding relay 2RAHR or 2RBHR establishes connection from terminal B to channel 7*a*, and the signal indication relay 2RHK at the office is picked up to extinguish the lamp 2NE and light lamp 2RE to inform the operator that the signal has been cleared.

As previously stated, when relay 2RSPR releases, its contact 19 interrupts the circuit of relay 2RSPAR and the release time of relay 2RSPAR begins. The release time of this relay is such that its contacts remain picked up for a substantial time interval so that contact 18 of the relay interrupts the circuit of relay 2RSPR. After the expiration of the release time of relay 2RSPAR, and consequent closing of its back contact 18, energy is not supplied to relay 2RSPR if coded energy has been received over the track rails, as manifested by picking up of contact 17 of relay 2RHR. Hence, if the first impulse of actuating energy has been effective, and has caused the code sending relay 4LCSR at the exit end of the stretch to be picked up to thereby cause coded energy to be supplied to the exit end of the stretch so that it is cascaded to the entrance end of the stretch to pick up relay 2RHR, the circuit of relay 2RSPR is interrupted and this relay will remain released. This is proper since there is no reason for the relay to be picked up again. However, if for any reason the first impulse of actuating energy supplied to the rails of the track stretch has not been effective, as shown by the fact that relay 2RHR is released at the expiration of the release time of relay 2RSPAR, energy will be supplied to the relay 2RSPR and its contacts will pick up to establish the circuit of relay 2RSPAR and thereby cause another impulse of actuating energy to be supplied to the rails of the track stretch.

This second impulse of actuating energy will be repeated or cascaded throughout the stretch to the exit end to pick up the track relay 9LTR and thus pick up the code sending relay 4LCSR to cause coded energy to be supplied to the rails of the track stretch on termination of the actuating impulse and consequent release of relay 9LTR. This coded energy will be repeated to the entrance end of the stretch to pick up the relay 2RHR and prevent subsequent supply of actuating impulses to the entrance end of the stretch.

As long as relay 2RHSR remains reversed and the relay 2RHR remains released, the cycle of operation of the actuating impulse generating relays 2RSPR and 2RSPAR continues so that the relay 6RCTPR causes energy to be supplied to the rails of section 6T for periods which are separated by periods long enough to enable coded energy supplied at the exit end of the stretch to be cascaded throughout the stretch to the entrance end to pick up relay 2RHR and interrupt the cycle of operation of the actuating impulse generating relays.

It will be seen, therefore, that on reversal of relay 2RHSR to clear the entering signal, the actuating impulse generating relays are placed in operation to cause energy to be supplied over the track rails of the stretch from the entrance to the exit end, while the cycle of operation of the actuating impulse generating relays is interrupted as soon as the relay 2RHR picks up to show that further operation of these relays is unnecessary. The actuating impulse generating relays will continue to operate, however, until relay 2RHR picks up to show that their operation is no longer required. This insures that if for any reason the first actuating impulse is not repeated throughout the stretch to the exit end, subsequent actuating impulses will be supplied to the stretch until traffic is established in the desired direction, or until the operator restores the relay 2RHSR to normal to show that this direction of traffic is no longer desired.

As explained above, when coded energy is received at the entrance end of the stretch and the head block signal is cleared, an indication code is sent to the office to show that the signal has been cleared and to show that the track stretch is unoccupied.

If an eastbound train now accepts signal 2RA and enters the single track stretch, it first enters the detector section 1T and releases track relay 1TR so that its contact 101 interrupts the circuit of relay 1TKSR and it releases with the result that its contact 102 connects terminal B to channel 2a to pick up the track indication relay 1TK and light lamp 1TKE. In addition, on release of relay 1TKSR, its contact 103 connects terminal C to the circuit which includes the lower windings of signal control relays 2LHSR and 2RHSR in series with the result that energy supplied through the lower winding of relay 2RHSR moves the relay contacts to their normal position.

Also, on release of relay 1TR, its contact 93, Fig. 1A, interrupts the previously traced circuit for supplying energy to relay 2BPR and this relay releases, while contact 104 of relay 1TR establishes a pick-up circuit for the approach locking relay 2RASR.

As a result of movement of the contacts of relay 2RHSR to their left-hand or normal position, and also as a result of release of contact 11 of relay 2BPR, the circuit of relay 2RAHR is interrupted and its contact 100 releases to interrupt the circuit of the green lamp of signal 2RA and to establish the circuit of the red lamp of this signal.

In addition, as a result of movement of contact 10 of relay 2RHSR to its left-hand or normal position, energy is supplied over this contact and wire 119 and over back contact 104 of relay 1TR to the approach locking relay 2RASR and its contacts pick up so that contact 106 establishes the stick circuit to maintain the relay contacts picked up after section 1T is vacated and relay 1TR picks up. When relay 2RASR picks up, its contact 96 additionally interrupts the circuit of relay 2RAHR to insure that it remains released and holds signal 2RA at stop.

On movement of the contacts of relay 2RHSR to their left-hand or normal position, contact 12 in the circuit leading to relay 2RCSR is closed, but at this time this circuit is open at contact 107 of relay 1TR so the relay 2RCSR remains released. In addition, on this movement of the contacts of relay 2RHSR, its contact 14 in the circuit of relay 2RRR is closed, but at this time this circuit is open at contact 108 of relay 1TKSR so the relay 2RRR remains released.

Furthermore, on movement of the contacts of relay 2RHSR to their normal position, contact 15 interrupts the circuit leading to relay 2RSPR so that energy is not supplied to this relay on subsequent release of relay 2RHR.

When the train under consideration advances into section 6T, the track relay 6RTR is shunted and remains released so that its contact 29 no longer establishes the circuit of the repeater relay 6RTPR and it releases with the result that its contact 89 interrupts the circuit of relay 6RTFPR and it releases after a short time interval. As a result of cessation of code following operation of relay 6RTPR, energy ceases to be supplied through the decoding transformer 2RDT to the relay 2RHR and its contacts release so that contact 87 interrupts the pick-up circuit of the relay 2RFSR and establishes for this relay the stick circuit which includes its own front contact 110. Hence, the contacts of relay 2RFSR remain picked up.

As a result of release of relay 2RHR its contact 83 in the circuit for supplying energy to relay 2RRR is opened and energy will not be supplied to relay 2RRR upon subsequent picking up of the contacts of relay 1TKSR. Furthermore, on release of relay 2RHR, its contact 17 interrupts the circuit over which energy is supplied to relay 2BPR to insure that relay 2BPR remains released. After release of relay 2RHR its back contact 17 in the circuit for supplying energy to relay 2RSPR is closed, but at this time this circuit is open at contact 15 of relay 2RHSR so the relay 2RSPR remains released.

In addition, on release of relay 2RHR its contact 84 interrupts the stick circuit for relay 2RHPR and it releases with the result that its contact 154 interrupts the circuit of relay 2RBKR and it releases so that its contact 155 connects terminal B of the source to channel 5a, which picks up relay 2RBK to establish the circuit of lamp 2—4BKE and this lamp is lighted to show that the single track stretch is occupied.

As a result of release of relay 2RAHR the supply of energy to channel 7a is interrupted and relay 2RHK releases to extinguish the lamp 2RE and light the lamp 2NE to show that signal 2RA is now at stop.

When the train vacates section 1T the track relay 1TR picks up so that relay 1TKSR picks up to release relay 1TK and extinguish the lamp 1TKE.

When the train advances into section 7T, the track relay 7RTR releases and remains released so that relay 7RTPR also releases and remains released with the result that relays 7RTFPR and 7RTBPR release. On release of relay 7RTBPR its contact 69 interrupts the circuits of the lamps of signal 7ES and this signal ceases to display a proceed indication. On release of relay 7RTFPR its contact 66 interrupts the circuit for supplying energy to the primary winding of the decoding transformer 6—7DT and energy ceases to be supplied through this transformer to relays 6—7HR and 6—7DR and they are both released. In addition, on release of relay 7RTBPR, one of its contacts interrupts the circuit of the code transmitter 75CT and it ceases to operate.

As a result of release of these relays the supply of energy to the transmitter relay 6LCTPR is interrupted and it ceases to cause energy to be supplied from the battery 6RTB to the rails of section 6T. Accordingly, when the train vacates section 6T, energy is not supplied over the rails of this section and the relay 6RTR, Fig. 1A, remains released.

When the train under consideration advances into section 8T, the track relay 8TR releases and its contact 35 interrupts the circuit for supplying energy to relay 7LCTPR so it ceases to cause energy to be supplied from battery 7RTB to the rails of section 7T.

When the train advances into section 9T, the relay 9RTR remains released and its contact 61 interrupts the circuit of relay 7LCTPR so that it remains released after section 8T is vacated and relay 8TR picks up.

If signal 4RA or 4RB is now cleared to permit the train to pass out of the stretch, the train may enter section 3T, thereby releasing relay 3TR. Signal 4RA or 4RB may be controlled in any suitable manner well known in the art and the details of the control of this signal are not necessary for an understanding of this invention and therefore have been omitted to simplify this disclosure.

When the train enters section 3T, track relay 3TR releases and its contact 57 connects the wire leading from the left-hand terminal of the winding of relay 9LCTPR to terminal C of the source to insure that the contacts of relay 9LCTPR remain in their reverse position as long as section 3T is occupied. Accordingly, relay 9LCTPR ceases to supply energy from battery 9RTB to the rails of section 9T, and when section 9T is vacated, relay 9RTR remains released.

When the train under consideration enters section 3T and releases relay 3TR, the relay 3TKSR, Fig. 1E, releases to connect terminal B to channel 2b to pick up relay 3TK and light lamp 3TKE to show that the detector section at this end of the stretch is occupied.

When the train vacates section 3T, the track relay 3TR picks up and establishes the circuit of relay 3TKSR so that it picks up, and consequently relay 3TK at the office is released to extinguish the lamp 3TKE.

Referring again to Fig. 1F, it will be seen that when relay 3TR picks up its contact 57 transfers the wire leading from the left-hand terminal of the winding of relay 9LCTPR from terminal C of the source to the contact 58 of relay 4LASR which is picked up at this time. Accordingly, when relay 3TR picks up, the winding of relay 9LCTPR is connected to the previously traced circuit including wires 136 and 135 and contact 75 of the code transmitter 75CT with the result that relay 9LCTPR again operates to cause coded energy to be supplied from the battery 9RTB to the rails of section 9T. On the supply of coded energy to the rails of section 9T the equipment at the intermediate locations in the track stretch causes coded energy to be supplied to each of the other sections in the stretch with the result that coded energy is supplied to relay 6RTR, Fig. 1A, and operates its contact to cause relay 6RTPR to follow coded energy to pick up relay 6RTFPR and to cause energy to be supplied through the decoding transformer 2RDT to relay 2RHR.

It is assumed that relay 3RHSR remains in its normal position, and has not been reversed to reclear the signal 2RA for a second or following eastbound train. If relay 2RHSR is reversed when coded energy is received at the west end of the stretch, the equipment operates substantially as described above in connection with the original clearing of signal 2RA.

On initial code following operation of relay 6RTPR, its contact 112 establishes a circuit including back contact 82 of relay 2RHR for supplying energy to the relay 2RCSR. However, the relay 2RCSR is of a type the contacts of which are slow in picking up, and the various parts of the equipment are proportioned so that before the relay 2RCSR becomes picked up the relay 2RHR picks up with the result that its contact 82 interrupts the circuit of relay 2RCSR. Accordingly, at this time the relay 2RCSR remains released and its contact 113 does not establish the circuit of relay 2RCSPR and it remains released.

When relay 2RHR picks up, its contact 84 establishes the circuit of relay 2RHPAR and it picks up to establish the circuit of relay 2RHPR so it picks up to establish its own stick circuit and to interrupt the circuit of relay 2RHPAR. The operation of relays 2RHPR and 2RHPAR at this time is merely incidental and need not be considered further.

When relay 2RHR picks up, its contact 83 establishes the circuit including back contact 114 of relay 2RCSPR, normal polar contact 14 of relay 2RHSR, and front contact 108 of relay 1TKSR for supplying energy to the restoring code relay 2RRR and its contacts pick up with the result that contact 85 interrupts the circuit of relay 2RFSR and establishes the circuit of the restoring code repeater relay 2RRPR.

On interruption of the circuit of relay 2RFSR its contacts release, and contact 90 connects relay 2RBKR over back contact 91 of relay 2RCSPR to terminal B of the source so relay 2RBKR picks up, which disconnects terminal B from channel 5a and releases relay 2RBK to extinguish the lamp 2—4BKE.

Referring again to Figs. 1A and 1B it will be seen that when relays 2RRR and 2RRPR are both picked up, the wire 131 leading from the left-hand terminal of the winding of relay 6RCTPR is connected over front contact 25 of relay 2RRPR and over front contact 115 of relay and wire 130 to back contact 20 of relay 6RTR and thus to terminal B of the source. Accordingly, energy is supplied to relay 6RCTPR and causes its contacts to move to their left-hand or normal position in which the battery 6LTB is connected across the rails of section 6T. The battery 6LTB is connected across the track rails in series with the track relay 6RTR and the polarity of the energy supplied from the battery to the relay winding is such as to cause the track relay contacts to remain released, thereby interrupting the circuit of relay 6RTPR. Accordingly, relay 6RTPR remains released and ceases to cause energy to be supplied through the transformer 2RDT to the relay 2RHR and after a short time interval the contacts of relay 2RHR release with the result that contact 83 interrupts the circuit of relay 2RRR. The relay 2RRR is snubbed by a condenser which is proportioned so that on interruption of the supply of energy to the relay winding and to the condenser, the relay contacts are maintained picked up for a substantial time interval, such as 6 seconds. Accordingly, relay 2RRR remains picked up and maintains the circuit of relay 2RRPR for a substantial time interval after relay 2RHR releases. As long as relay 2RRR remains picked up the contacts of relay 6RCTPR are caused to remain in their normal position in which the battery 6LTB is connected across the track rails. As a result, energy is supplied from the battery 6LTB to the rails of section 6T for a considerable time interval and energy supplied to the rails of this section feeds to track relay 6LTR, Fig. 1C, during a released period of the contact of relay 6LCTPR. As soon as the relay 6LTR picks up, its contact 27 interrupts the circuit for supplying coded energy to relay 6LCTPR so that the contact of relay 6LCTPR is certain to remain released and maintain the circuit of relay 6LTR. As a result relay 6LTPR picks up and establishes the circuit of relay 6LTFP and it picks up so that during a released period of the contact of relay 7RTR energy is supplied over the previously traced circuit to relay 7RCTPR and picks up its contact. When this occurs, the battery 7LTB is connected across the track rails in series with relay 7RTR so that contact 30 of relay 7RTR is certain to remain released and maintain the circuit of relay 7RCTPR.

The energy supplied from battery 7LTB to the rails of section 7T feeds to relay 7LTR, Fig. 1D, during a released period of contact 63 of relay 7LCTPR and picks up the contact of relay 7LTR so that energy is supplied over the previously traced circuit to relay 9RCTPR and picks up its contact 40 to connect battery 9LTB across the rails of section 9T in series with the relay 9RTR. Accordingly, relay 9RTR releases and remains released so that it interrupts the circuit of relay 7LCTPR and it remains released to maintain the circuit for connecting relay 7LTR across the rails of section 7T.

The energy supplied from battery 9LTB to the rails of section 9T feeds to track relay 9LTR, Fig. 1F, during a period in which the contacts of relay 9LCTPR are in their reverse position. Accordingly, the contact of relay 9LTR picks up, thereby interrupting the circuit over which the left-hand terminal of the winding of relay 9LCTPR is connected to terminal B of the source during the picked-up periods of the code transmitter which governs the relay. In addition, when relay 9LTR picks up, the relays 9LTPR and 9LTFPR pick up and contact 54 of relay 9LTFPR connects the wire 136 leading from the left-hand terminal of the winding of relay 9LCTPR to terminal C of the source. As a result the contacts of relay 9LCTPR move to their reverse position and remain in that position to maintain the circuit of relay 9LTR and cease to cause energy to be supplied from battery 9RTB to the rails of section 9T.

From the foregoing it will be seen that when the stretch is vacated and the head block signal 2RA has not been recleared, the restoring code relays 2RRR and 2RRPR are picked up and operate relay 6RCTPR to cause steady energy to be supplied from the battery 6LTB to the rails of section 6T. This steady energy picks up relay 6LTR to cause steady energy to be repeated or cascaded through the other sections of the stretch to the right-hand or exit end of the stretch. The steady energy supplied from left to right over the stretch cuts off the supply of coded energy over the rails of the stretch in the opposite direction. Accordingly, the code detecting relays at the intermediate locations release and remain released.

After the expiration of the release time of relay 2RRR its contacts release with the result that contact 85 interrupts the circuit for supplying energy to relay 2RRPR, but this relay is snubbed by a condenser which is proportioned so that it maintains the relay contacts picked up for a substantial time interval, such as 6 seconds, subsequent to the interruption of the supply of energy to the relay. Accordingly, on release of relay 2RRR, the relay 2RRPR remains picked up for a substantial time interval.

After release of relay 2RRR, and prior to release of relay 2RRPR, the wire 131 leading from the left-hand terminal of the winding of relay 6RCTPR is connected over front contact 25 of relay 2RRPR, back contact 115 of relay 2RRR, wire 139 and back contact 140 of relay 2LAHR to contact 141 of the code transmitter 75CT. During the picked-up periods of the code transmitter 75CT its contact 141 is connected over back contact 29 of relay 6RTR to terminal B of the source, while during the released periods of the code transmitter this contact is connected to terminal C of the source. Accordingly, relay 6RCTPR is now operated to cause coded energy to be supplied from battery 6LTB to the rails of section 6T. During the first off period in the coded energy supplied from battery 6LTB to the rails of section 6T, the relay 6LTR, Fig. 1C, releases and its repeater relay 6LTPR also releases. On release of relay 6LTR its back contact 27 is closed but energy is not supplied to relay 6LCTPR since relay 7RTFPR is released and its contact 71 interrupts the circuit of relay 6LCTPR. Accordingly, relay 6LCTPR remains released and maintains the circuit of relay 6LTR so that relay 6LTR responds to coded energy supplied over the rails of section 6T. As a result of the code following operation of relay 6LTPR the relays 6LTFPR and 6LTBPR are both picked up so that back contact 39 of relay 6LTBPR interrupts the previously traced circuit for supplying steady energy to relay 7RCTPR, while contact 118 of relay 6LTFPR establishes a circuit for supplying energy to the primary winding of decoding transformer 6—7DT and energy is supplied through this transformer to pick up the contacts of relay 6—7HR. As soon as the contacts of relay 6—7HR pick up coded energy is supplied to relay 7RCTPR over the circuit which includes back contact 30 of relay 7RTR, front contact 38 of relay 6LTFPR, front contact 39 of relay 6LTBPR, a contact of code transmitter 75CT, front contact 119 of relay 6—7HR, and back contact 120 of relay 7RTFPR. Accordingly, the relay 7RCTPR is now operated to supply coded energy from battery 7LTB to the rails of section 7T.

On the change in the energy supplied to section 7T from steady to coded, the relay 7LTR, Fig. 1D, follows coded energy and causes coded energy to be supplied to the relay 9RCTPR so that it causes coded energy to be supplied from battery 9LTB to the rails of section 9T.

On the change in the energy supplied to the rails of section 9T, the relay 9LTR, Fig. 1F, releases and interrupts the circuit of relay 9LTPR so that it releases. On movement of the contact 41 of relay 9LTR to its released position, no connection is established from terminal B of the source to the left-hand terminal of the winding of relay 9LCTPR since the wire 136 leading from this terminal of the relay winding is connected over front contact 54 of relay 9LTFPR to terminal C of the source. The relay 9LTFPR is slow enough in releasing to remain picked up during the off periods in the coded energy supplied over the rails of section 9T so the relay 9LTFPR prevents operation of relay 9LCTPR by coded energy at this time and insures that its contacts will remain in their right-hand or reverse position and maintain the circuit of relay 9LTR.

As a result of code following operation of relay 9LTR, the relay 9LTPR follows code and causes energy to be supplied through the decoding transformer 4LDT to relay 4LHR to pick up its contacts with the result that contact 45 interrupts the circuit of relay 4LCSR and its contacts release so that contact 47 interrupts the circuit of relay 4LCSPR. The relay 4LCSPR is snubbed by a condenser which is proportioned so that the contacts of relay 4LCSPR remain picked up for a considerable time interval, such as 20 seconds, subsequent to release of relay 4LCSR and consequent interruption of the supply of energy to the winding of relay 4LCSPR and the associated condenser.

The relay 4LHR, which causes release of the code sending relay 4LCSR, is of a type the contacts of which are slow to pick up so the relay will not be picked up by the energy supplied thereto in response to a single picking up of the contacts of relay 9LTR, but will be picked up only in response to repeated operation of the contacts of relay 9LTR.

Accordingly, after eastbound traffic has been established in the stretch and relay 4LCSR is picked up to cause coded energy to be supplied at the right-hand end of the stretch, the relay 4LCSR will not be released to cut off the supply of coded energy to the track rails, and thus interfere with the established traffic direction in the stretch, as a result of a single movement of the contacts of relay 9LTR to their picked-up position, such as might be caused by an irregular track circuit condition or by vibration or some other unusual condition.

On the other hand, when coded energy is supplied over the rails of the track stretch for the purpose of cutting off the supply of energy to the stretch and restoring the apparatus to its normally deenergized condition, the track relay 9LTR is repeatedly operated by the coded energy and picks up relay 4LHR to release relay 4LCSR and discontinue the supply of coded energy to the stretch. The arrangement of the apparatus, therefore, is such as to prevent inadvertent interruption of the supply of coded energy to the stretch, while at the same time making certain that the supply of coded energy will be cut off when its further supply is no longer desired.

When relay 4LHR is picked up by the coded energy portion of the restoring code its contact 124 establishes the circuit of relay 4LHPAR and it picks up to establish the circuit of relay 4LHPR. Accordingly, relay 4LHPR picks up and establishes its stick circuit and interrupts the circuit of relay 4LHPAR. After picking up of relay 4LHPR and release of relay 4LHPAR the contacts of these relays in the circuit of relay 4BPR are closed, but the circuit of this relay is open at contact 52 of relay 4LCSPR so the relay 4BPR is certain to remain released and maintain the signal 4L at stop.

Similarly, when relay 4LHPAR is released and relay 4LHPR is picked up, the contact 127 of relay 4LHPAR and the contact 128 of relay 4LHPR in the pick-up circuit of relay 4LFSR are closed, but as long as relay 4LCSPR is picked up its contact 51 interrupts the circuit of relay 4LFSR. Hence, as long as relay 4LCSPR remains picked up the relay 4LFSR is certain to remain released and prevent the supply of energy to relay 4LBKR over the circuit governed by contacts of the relays 4LHPAR and 4LHPR.

In addition, as soon as relay 4LHPAR picks up energy is supplied over front contact 122 of relay 4LHR, front contact 50 of relay 4LCSPR, and front contact 126 of relay 4LHPAR to the winding of relay 4LCSPR and to the condenser associated therewith. This circuit is maintained as long as relays 4LHPAR and 4LHR remain picked up, and the energy supplied over this circuit delays the start of the release time of the relay 4LCSPR. This arrangement insures that when relay 4LHR is picked up as a result of the coded energy portion of the restoring code the relay 4LCSPR will remain picked up until relay 4LHR releases. When relay 4LHR releases its contacts in the circuit of relay 4BPR, and in the pick-up circuit of relay 4LFSR, are open so these relays remain released on subsequent release of relay 4LCSPR. Similarly, when relay 4LHR releases its contact 122 in the circuit for supplying energy to relay 4RRR is open and this relay is certain to remain released on release of relay 4LCSPR.

Referring again to Fig. 1B, the relay 2RRPR releases after an appropriate interval and its contact 25 interrupts the circuit traced above for supplying coded energy to the wire 131 leading from the left-hand terminal of the winding of relay 6RCTPR and connects this wire over back contact 24 of relay 6RTFPR, back contact 23 of relay 2RCSR, and back contact 22 of relay 2RSPAR to terminal C of the source, so that the contacts of relay 6RCTPR are moved to their right-hand or reverse position and remain in that position. As a result relay 6RCTPR ceases to cause coded energy to be supplied from the battery 6LTB to the rails of section 6T, and relay 6LTR, Fig. 1C, releases and remains released so that relays 6LTFP, 6LTBP, and 6—7HR release and discontinue the supply of coded energy to relay 7RCTPR. Accordingly, relay 7RCTPR ceases to cause energy to be supplied from battery 7LTB to the rails of section 7T and relay 7LTR, Fig. 1D, ceases to establish the circuit of relay 9RCTPR and it remains released so that energy is no longer supplied from battery 9LTB to the rails of section 9T. Accordingly, relay 9LTR, Fig. 1F, releases and remains released so that relay 9LTPR also releases, and after a short time interval the relay 9LTFPR releases while relay 4LHR also releases.

On release of relay 4LHR its contact 124 interrupts the circuit of relay 4LHPR and it releases after a short time interval.

When relay 9LTFPR releases, its contact 54 transfers the wire 136 leading from the left-hand terminal of relay 9LCTPR from terminal C of the source to a connection leading over back contact 48 of relay 4LCSR and back contact 111 of relay 4LSPAR to terminal C of the source.

As previously explained, the release time of relay 4LCSPR is relatively long and the various parts of the equipment are proportioned so that relay 4LCSPR remains picked up until after relay 4LHR releases. Accordingly, contact 50 of relay 4LCSPR continues to interrupt the circuit of relay 4RRR until after this circuit is interrupted at contact 122 of relay 4LHR, and the relay 4RRR is certain to remain released at this time. In addition, contact 51 of relay 4LCSPR continues to interrupt the pick-up circuit of relay 4LFSR until after this circuit is interrupted at contact 123 of relay 4LHR, so the relay 4LFSR is certain to remain released at this time.

In addition, as long as relay 4LCSPR is picked up its contact 52 interrupts the circuit of relay 4BPR and insures that it remains released and cannot be picked up at a time while relay 4LHR is picked up in response to the frequency code portion of the restoring code supplied over the track rails. If relay 4BPR could be picked up, it might result in temporary unwarranted display of a proceed indication by one of the signals 4LA or 4LB, but the contact 52 of relay 4LCSPR in the circuit of relay 4BPR prevents this improper clearing of one of the signals at this time.

After expiration of the release period of relay 4LCSPR its contacts release and energy is supplied over its back contact 49 and over back contact 156 of relay 4LFSR to relay 4LBKR and its contacts pick up. When relay 4LBKR picks up its contact 153 interrupts connection from terminal B to channel 5b and releases relay 4LBK and the equipment is again in substantially the condition in which it is illustrated in the drawings. At this time the coded track circuit equipment is deenergized while the equipment at the office, Fig. 2, shows that the head block signals at both ends of the stretch are at stop, and that the block is unoccupied.

The operation of the equipment when one of the signals 4LA or 4LB is cleared to authorize movement of a westbound train through the stretch, and in restoring the equipment to its normally deenergized condition after the stretch is vacated, is substantially the same as described above in connection with eastbound traffic and need not be traced in detail.

*Construction and operation of electric switch lock and control means therefor*

This system provides complete control of the lock on a hand-throw switch at an intermediate point in a track stretch to permit a train on the main track to enter a siding, or to permit a train on the siding to enter the main track.

As shown, the track stretch includes a hand-throw track switch 8W. This switch may be provided with an operating mechanism comprising a hand-throw switch stand, which may, for example, be of the type shown in Letters Patent of the United States No. 2,184,870, issued to Herbert L. Bone and Kenneth J. J. McGowan on December 26, 1939, for Railway Switch Operating Mechanisms. The operation of this switch is governed electrically by an electric switch lock controlled by a lock magnet 8WL. The electric lock may be applied directly to the lock rod of the switch in a well-known manner, but preferably it is applied to the operating lever of the switch stand.

The electric switch lock may be of the type disclosed in Letters Patent of the United States No. 1,126,834, issued to W. P. Neubert and W. E. Smith, on February 2, 1915, for Electric Switch Locks. For an understanding of the details of operation of the locking mechanism reference may be made to this patent, but for an understanding of this invention it is believed that it will suffice to point out that the operating lever of the switch stand is normally locked mechanically in a position to maintain the associated track switch locked normal, by means of a padlock. More particularly, a lever latch attached to a segment 160 is held in its locking position by the bail of a padlock 161, as indicated diagrammatically in the accompanying drawings, and as shown in detail in Fig. 1 of the Neubert et al. patent. To unlock the switch, the padlock must first be removed by one of the train crew to permit segment 160 to be moved a short distance to engage the locking dog 162 and close the contact 163 and open contact 164. Then, if traffic conditions are such that it is proper, the winding of the lock magnet 8WL will become energized to lift the locking dog 162, permitting the segment 160 to be moved to its full reverse position in which the operating lever of the switch is free to be operated. The movement of the switch lever toward its reverse position projects one end of a rod 165, arranged as shown in Figs. 1, 5, and 6 of the Neubert and Smith patent, into the path of the lever latch with the result that the segment 160 is held reversed and cannot be restored to its normal position as long as the switch operating lever is out of its normal position.

The equipment at the switch lock location also includes a switch repeater relay 8NWPR, two slow release track repeater relays 7LTFPR and 9RTFPR, two slow release code detector relays 7LTBPR and 9RTBPR, a code detector repeater relay 9LRTBR, a lever repeater relay 8WLPR and a stick repeater relay 8WLPSR, a push button 8PB and a stick relay 8WLSR, a time element relay 8TER and a pair of actuating code relays 8SPR and 8SPAR.

It is to be understood that the switch stand is equipped with a switch circuit controller and point detector having contacts 166 and 167 which are governed so as to establish a circuit over which energy may be supplied to the relay 8NWPR when and only when the operating lever of the switch is in its normal position. These contacts are also governed so that they shunt the circuit of the relay 8NWPR when the operating lever of the switch is out of its normal position.

The switch lock 8WL also includes contacts 170 and 171 which are closed only when the winding of the lock magnet is deenergized, and when, in addition, the segment 160 and the locking dog 162 are in their normal positions.

If a train on the main track is to enter the siding, the train is advanced into section 8T, Fig. 1D, thereby releasing track relay 8TR. On release of relay 8TR connection is established from terminal B of the source over back contact 60 of relay 8TR and contact 168 of relay 8WLPR to a wire over which energy may be supplied to the winding of lock 8WL.

When the padlock 161 is removed from the switch lock 8WL the segment 160 moves to a position in which contact 163 is closed so that energy is supplied to relay 8WLPR and its contacts pick up. In addition, at this time contact 164 is open and interrupts the circuit of relay 8NWPR so that its contacts release.

As explained above, when section 8T is occupied and relay 8TR is released, its front contact 35 is opened. This interrupts the circuit governed by contact 61 of relay 9RTR for operating relay 7LCTPR, and interrupts the circuit governed by contact 36 of relay 7LTR for operating relay 9RCTPR. Accordingly, when relay 8TR is released, transmission of coded energy in either direction past section 8T is prevented.

In addition, when relay 8NWPR releases, its contacts 37 and 62 further interrupt the circuits governed by the track relays 9RTR and 7LTR for operating the relays 7LCTPR and 9RCTPR to prevent transmission of coded energy past the switch 8W when the switch is unlocked.

When relay 8WLPR picks up, energy is supplied over back contact 60 of relay 8TR and front contact 168 of relay 8WLPR to the winding of the switch lock 8WL. As a result the locking dog 162 is lifted out of the path of movement of the segment 160 and permits the segment to be moved to its full reverse position in which the switch lever is free to be operated.

Also, when the winding of the lock 8WL is energized contacts 170 and 171 are opened and insure that relay 8NWPR remains released as long as the switch lock is energized.

When the operating lever of the switch is reversed to move the switch points to their reverse position, contacts 166 and 167 interrupt the connections for supplying energy to the wires leading to relay 8NWPR and shunt these wires to insure that relay 8NWPR remains released.

When the train under consideration moves into the siding and vacates section 8T, the track relay 8TR picks up with the result that its contact 60 interrupts the circuit for supplying energy to the winding of the lock 8WL. At this time the segment 160 holds the locking dog 162 in its upper position with the result that the locking dog holds contacts 170 and 171 in their open position to interrupt the circuit of relay 8NWPR. Furthermore, the circuit of relay 8NWPR is interrupted by contact 164 of the switch lock. Accordingly, when the operating lever for the switch is returned to its normal position and contacts 166 and 167 again establish connections from the source to the wires leading to the winding of the relay 8NWPR, the relay 8NWPR remains released and its contacts 37 and 62 interrupt the circuits for operating relays 9RCTPR and 7LCTPR and thereby prevent transmission of coded energy past the switch 8W in either direction. This insures that after the stretch has been vacated, but before the switch has been restored to normal and is locked in that position, the coded track circuit equipment cannot operate to clear a signal governing movement of trains approaching the switch. As the signals governing movement of traffic approaching the switch are held at stop as long as the switch is unlocked, there is no danger that a train will approach or pass over the switch when it is not safe for it to do so.

When the padlock 161 is replaced on the lock 8WL, the segment 160 is restored to its normal position, thereby permitting the locking dog 162 to drop to its normal position so that contacts 170 and 171 move to their closed position. In addition, when the padlock 161 is replaced, the contact 163 is moved to its open position and contact 164 is moved to its closed position. When relay 8WLPR releases, its contact 168 in the circuit of the winding of the lock 8WL is open so this winding will not be energized during subsequent occupancy of section 8T. When contact 164 of the switch lock closes, the circuit of the relay 8NWPR is complete and its contacts pick up so that contact 37 establishes the circuit governed by relay 7LTR for operating the relay 9RCTPR, and contact 62 of relay 8NWPR establishes the circuit governed by contact 61 of relay 9RTR for operating the relay 7LCTPR. Accordingly, coded energy may now be transmitted in either direction past the switch. This coded energy may clear a signal governing traffic approaching the switch or it may be repeated to the entrance end of the stretch and cause the equipment at the entrance end of the stretch to show that the stretch is unoccupied and to cause the coded track circuit equipment to be restored to its normally deenergized condition.

This system also operates to control energization of the winding of the lock 8WL to permit a train on the siding to enter the main track. When a train on the siding is to enter the main track, one of the train crew telephones or otherwise communicates with the operator at the central office and ascertains if it is permissible to unlock the switch. It is desirable for the train crew to secure permission from the operator at the central office before attempting to unlock the switch, since, as a preliminary step in unlocking of the switch, the transmission of coded energy past the switch is prevented. If an attempt is made to release the switch while the stretch is prepared for traffic, the resulting interruption of transmission of coded energy past the switch will put signals in the rear of the switch to stop and may interfere with train movements planned by the operator.

Although it is desirable for the train crew to secure permission from the operator at the central office before attempting to unlock the switch, it is not essential. If for any reason the train crew cannot establish communication with the operator at the central office, the switch may be unlocked if conditions are such that it is safe for the switch to be operated.

For purposes of illustration it will be assumed that at the time the train is to leave the siding the coded track circuit equipment is in its deenergized condition and that one of the train crew has received permission from the operator at the central office to unlock the switch.

When the padlock 161 is removed from the switch lock, the segment 160 moves as far as permitted by the locking dog 162, and on this movement of the segment 160, contact 163 is moved to its closed position so that relay 8WLPR picks up, and contact 164 moves to its open position in which it interrupts the circuit of relay 8NWPR and its contacts release.

When relay 8WLPR picks up energy is supplied over its front contact 172, over back contact 173 of relay 8WLPSR, back contact 174 of relay 9LRTBPR, and back contact 175 of relay 8SPAR to the winding of the actuating code relay 8SPR. Accordingly, the contacts of relay 8SPR pick up and its contact 176 establishes the circuit of the relay 8SPAR so that its contacts pick up and contact 175 interrupts the circuit of relay 8SPR. The relays 8SPR and 8SPAR are snubbed by condensers so their contacts remain picked up for a substantial time interval after the supply of energy thereto is interrupted. Accordingly, the contacts of relay 8SPR remain picked up for a substantial time interval after relay 8SPAR picks up, and as long as relay 8SPR is picked up energy is supplied to relay 8SPAR so that its release time does not start until relay 8SPR releases. As long as relay 8SPAR remains picked up, the circuit of relay 8SPR is interrupted, but on release of relay 8SPAR its contact 175 in the circuit of relay 8SPR is closed and the cycle of of operation described above is repeated, unless the circuit of relay 8SPR is interrupted by one of the other relays by which it is governed. The operation of the relays 8SPR and 8SPAR is similar to relays 2RSPR and 2RSPAR at the west end of the stretch. The operation of relays 8SPR and 8SPAR is such that the contacts of both of the relays pick up and remain picked up for a substantial time. The relay 8SPR then releases, while the relay 8SPAR thereafter releases, whereupon the relays both pick up again if operation of the relays is required.

During the period in which the relays 8SPR and 8SPAR are both picked up, energy is supplied to the transmitting relays 9RCTPR and 7LCTPR and their contacts pick up to cause energy to be supplied from the associated track batteries to the track rails. The circuit for supplying energy to the relay 9RCTPR includes front contact 35 of relay 8TR, front contact 177 of relay 8SPAR, front contact 178 of relay 8SPR, and back contact 179 of relay 9RTFPR, while the circuit for supplying energy to the relay 7LCTPR includes front contact 35 of relay 8TR, front contact 181 of relay 8SPAR, front contact 182 of relay 8SPR, and back contact 183 of relay 7LTFPR.

The energy supplied from battery 9LTB to the rails of section 9T picks up the contact of relay 9LTR, Fig. 1F, so that relay 9LTPR picks up and its contact 44 establishes the pick-up circuit of relay 4LCSR. As explained above, the relay 4LCSR is of a type the contacts of which are slow to pick up. The relays 8SPR and 8SPAR maintain the circuit of relay 9RCTPR long enough to cause energy to be supplied over the rails of section 9T for a period of time sufficient to cause the relay 9LTPR to establish the circuit of relay 4LCSR long enough to cause the contacts of relay 4LCSR to become picked up. When relay 4LCSR picks up its contact 46 establishes the relay stick circuit so the relay remains picked up after relay 9LTPR becomes released.

As long as relay 9LTPR is picked up one of its contacts establishes the circuit of relay 9LTFPR and its contact 54 is picked up and interrupts the circuit for supplying coded energy to relay 9LCTPR.

When relay 4LCSR picks up its contact 47 establishes the circuit of relay 4LCSPR and its contacts pick up with the result that contact 49 of relay 4LCSPR interrupts the circuit of relay 4LBKR. On release of relay 4LBKR its contact 153 connects terminal B to channel 5b and picks up relay 4LBK.

Similarly, the energy supplied from battery 7RTB to the rails of section 7T picks up the contact of relay 7RTR, Fig. 1C, to establish the circuit of relay 7RTPR. When relay 7RTPR picks up its contact 64 establishes the circuit of relay 7RTFP and its contacts pick up with the result that its contact 71 establishes the previously traced circuit for supplying energy to relay 6LCTPR and its contact picks up to connect the battery 6RTB across the rails of section 6T. The energy supplied from battery 6RTB to the rails of section 6T feeds to the relay 6RTR, Fig. 1A, and picks up its contact to establish the circuit of relay 6RTPR so that its contacts pick up. When the contacts of relay 6RTPR pick up its contact 112 establishes the pick-up circuit of relay 2RCSR. As previously explained the supply of energy over the rails of the track stretch is maintained for a substantial time interval so the relay 6RTPR is picked up long enough to insure that relay 2RCSR picks up. When the contacts of relay 2RCSR become picked up its contact 185 establishes the relay stick circuit to maintain the relay picked up after release of the relay 6RTPR.

Furthermore, when relay 6RTPR is picked up its contact 89 establishes the circuit of the relay 6RTFPR and its contacts pick up so that contact 24 interrupts the circuit for supplying coded energy to the relay 6RCTPR.

When relay 2RCSR picks up its contact 113 establishes the circuit of relay 2RCSPR and its contacts pick up so that its contact 91 interrupts the circuit of relay 2RBKR and its contacts release. On release of relay 2RBKR, its contact 155 connects terminal B to channel 5a and picks up relay 2RBK. As relays 2RBK and 4LBK are both picked up the circuit of the lamp 2—4BKE is established and this lamp is lighted to provide the occupied indication at this time. This is desirable since this track stretch is not available for normal traffic movements at this time.

After a short time interval the relay 8SPR releases and its contacts 178 and 182 interrupt the previously traced circuits for energizing the relays 9RCTPR and 7LCTPR and their contacts release to cut off the supply of energy from the track batteries to the rails of the track stretch. As a result, the relays 9LTR and 6RTR at the ends of the stretch release and the relays 9LTPR and 6RTPR release to interrupt the pick-up circuits of the relays 4LCSR and 2RCSR, but as explained above, these relays are maintained picked up by energy supplied over their stick circuits. In addition, on release of the relays 9LTPR and 6RTPR the circuits of the relays 9LTFPR and 6RTFPR are interrupted and their contacts release.

On release of the relay 9LTFPR its contact 54 connects wire 136 leading to the left-hand terminal of the winding of relay 9LCTPR over front contact 48 of relay 4LCSR and wire 135 to contact 75 of the code transmitter 75CT so the relay 9LCTPR is now operated and causes coded energy to be supplied from battery 9RTB to the rails of section 9T. This energy feeds over back contact 40 of relay 9RCTPR to relay 9RTR and operates it with the result that during the picked-up periods of relay 9RTR energy is supplied over its front contact 61 and over back contact 62 of relay 8NWPR to relay 9RTFPR and picks up its contacts so that during the released periods of relay 9RTR energy is supplied over its back contact 61 and over front contact 186 of relay 9RTFPR to relay 9RTBPR and its contacts pick up. In addition, when relay 9RTFPR picks up, its contact 179 interrupts the circuit governed by relays 8SPR and 8SPAR for supplying energy to the relay 9RCTPR so the relay 9RCTPR will not thereafter be operated by the relays 8SPR and 8SPAR. Accordingly, as soon as coded energy is received from the right-hand end of the stretch the relay 9RCTPR is held released and maintains the circuit of relay 9RTR.

When relay 6RTFPR, Fig. 1B, releases, its contact 24 connects wire 131 leading to the left-hand terminal of the winding of relay 6RCTPR over front contact 23 of relay 2RCSR, wire 139, back contact 140 of relay 2LAHR to contact 141 of the code transmitter 75CT so the relay 6RCTPR operates to supply coded energy to the rails of section 6T. This energy feeds to relay 6LTR, Fig. 1C, and operates it to pick up relays 6LTFP, 6LTBP, and 6-7HR to establish the previously traced circuit for supplying coded energy to relay 7RCTPR and it operates to supply coded energy from the track battery 7LTB to the rails of section 7T. This energy feeds to relay 7LTR, Fig. 1D, and during the picked-up periods of relay 7LTR energy is supplied over its front contact 36 and over back contact 37 of relay 8NWPR to relay 7LTFPR and its contacts pick up so that energy is supplied over its front contact 187 to relay 7LTBPR during the released periods of contact 36 of relay 7LTR. In addition, when relay 7LTFPR picks up, its contact 183 interrupts the circuit governed by relays 8SPR and 8SPAR for supplying energy to the relay 7LCTPR so the relay 7LCTPR is certain to remain released and maintain the circuit of relay 7LTR.

When the relays 7LTBPR and 9RTBPR are both picked up, indicating that coded energy is being received at the switch from both ends of the single track stretch, their contacts establish an obvious circuit for the relay 9LRTBPR and its contacts pick up so that contact 174 interrupts the circuit of relay 8SPR and thereby prevents it from picking up on subsequent release of the contacts of relay 8SPAR.

As explained above the supply of energy to the relays 9RCTPR and 7LCTPR is interrupted when relay 8SPR releases, while the relay 8SPAR remains picked up for a substantial time interval after relay 8SPR releases. Furthermore, as explained above, when relay 8SPR releases the supply of energy to the track rails at the switch is cut off and the equipment at the ends of the stretch supplies coded energy to the stretch, and this energy is repeated to the switch to operate the code following track relays at this location. The operation of the equipment is such that under normal conditions coded energy will be received at the switch from both ends of the stretch and will cause relays 7LTBPR and 9RTBPR to be picked up and pick up relay 9LRTBPR before relay 8SPAR becomes released. Accordingly, under normal conditions, when relay 8SPAR releases, relay 8SPR remains released. Hence, if on release of relay 8SPAR the coded track circuit apparatus on both sides of the switch has been placed in operation, as mainfested by energization of the code detecting relays at the switch, the relays 8SPR and 8SPAR remain released and do not cause the transmitter relays 9RCTPR and 7LCTPR to operate to supply additional impulses of actuating energy to the rails of the track stretch.

On the other hand, if at the time the relay 8SPAR becomes released, the coded track circuit apparatus on either side of the switch is not operating, as manifested by failure of a code detecting relay to become energized, the relay 9LRTBPR will remain released and its back contact 173 will be closed so that energy will be supplied to relay 8SPR. Accordingly, the relay 8SPR will pick up and its contact 176 will establish the circuit of relay 8SPAR so that its contacts pick up and the relays 8SPR and 8SPAR repeat the cycle of operation described above. During the portion of this cycle in which both of the relays 8SPR and 8SPAR are both picked up their contacts in the circuits for supplying energy to the transmitter relays 9RCTPR and 7LCTPR are closed and energy will be supplied to the transmitter relay associated with the portion of the stretch in which the coded track circuit equipment is inactive. At this time energy will not be supplied to the transmitter relay associated with the portion of the track stretch in which the coded track circuit equipment is active as one of the code detecting relays governed over this portion of the stretch will be picked up and will interrupt the circuit governed by the relays 8SPR and 8SPAR for supplying energy to the associated transmitter relay. This arrangement insures that the transmitter relay associated with a portion of the track stretch in which the coded track circuit equipment is inactive will be operated to supply impulses of actuating code energy to the track rails and thereby initiate operation of the coded track circuit equipment for this track portion. These impulses of actuating code energy will continue to be supplied to a portion of the track stretch until the coded track circuit apparatus for this track portion is rendered active, as manifested by energization of a code detecting relay, or until the attempt to unlock the switch is discontinued, as manifested by release of relay 8WLPR.

When coded energy is received at the switch from both ends of the single track stretch, the relay 9LRTBPR is energized, as explained above, and energy is supplied over its front contact 188 and over front contact 168 of relay 8WLPR to the winding of the switch lock 8WL. When this winding is energized, the locking dog 162 is lifted to permit the segment 160 to be moved to the position to release the operating lever of the switch 8W, while the contacts 170 and 171 are lifted to additionally interrupt the circuit of the relay 8NWPR. When the switch is reversed the contacts 166 and 167 additionally interrupt the circuit of relay 8NWPR.

When the train on the siding enters the main track, it will occupy section 7T for a short time before it enters section 8T and if this time is sufficient, relays 8SPR and 8SPAR will pick up and energize relay 7LCTPR but, since the rails of section 7T are shunted by the train, this is without effect. Relay 9RCTPR will not be operated, its circuit being open at contact 179 of relay 9RTFPR.

The presence of the train in section 7T causes relay 7LTR and the relays it controls to release, and when the train advances into section 8T the relay 8TR releases and energy is supplied over back contact 35 of relay 8TR and front contact 189 of relay 8WLPR to the relay 8WLPSR and its contacts pick up so that contact 190 establishes a stick circuit to keep the relay energized as long as relay 8WLPR is energized. In addition, when relay 8WLPSR picks up, its contact 173 interrupts the circuit of relay 6SPR to prevent operation of the relays 8SPR and 8SPAR during occupancy of section 8T, and also after the train enters section 9T and causes the code detecting relays governed over this track portion to remain released.

When relay 8TR releases, its contact 35 additionally interrupts the circuits governed by track relays 7LTR and 9RTR for supplying energy to the associated code detecting relays.

When section 8T is vacated, relay 8TR picks up so that its contact 60 interrupts the circuit which it controls for supplying energy to the lock 8WL, this winding is deenergized, but at this time the contacts 170 and 171 are mechanically held in their open position while contact 164 is also in its open position so the relay 8NWPR is certain to remain released after the switch is restored to its normal position.

When section 7T is vacated, relay 7LTR resumes its code operation, and when section 8T is vacated and relay 8TR picks up, the closing of front contact 35 establishes the circuit governed by contact 36 of relay 7LTR for supplying energy to the relays 7LTFPR and 7LTBPR and they become picked up.

The opening of back contact 35 interrupts the pick-up circuit of relay 8WLPSR, but relay 8WLPSR is maintained energized by current supplied over its stick circuit, so contact 173 continues to interrupt the circuit of relay 8SPR and prevent operation of relays 8SPR and 8SPAR.

When the padlock 161 is replaced on the lock 8WL the segment 160 is returned to its normal position and contact 163 is opened while contact 164 is closed. In addition, at this time contacts 170 and 171 are closed so the circuit of the relay 8NWPR is complete and its contacts pick up. When the contact 163 opens, the circuit of relay 8WLPR is interrupted and its contacts release so that contact 172 in the circuit of relay 8SPR is open and so that contact 189 interrupts the circuit of relay 8WLPSR and its contacts release.

When relay 8NWPR picks up, its contact 37 interrupts the circuit over which energy is supplied to relay 7LTFPR during the picked-up periods of relay 7LTR and establishes the circuit for supplying energy to relay 9RCTPR during the picked-up periods of relay 7LTR. Accordingly, relays 7LTFPR and 7LTBPR release and the relay 9RCTPR operates to cause impulses of energy to be supplied from battery 9LTB to the rails of section 9T, but these impulses are ineffective because of the presence of the train in section 9T.

The train under consideration may now leave the single track stretch at either end. If the train moves to the west so as to leave the stretch at the left-hand or west end, the intermediate signal 6WS will operate in the normal manner to indicate traffic conditions in advance.

For purposes of illustration it will be assumed that the train moves to the right so as to leave the single track stretch at the east end. When the train advances into the detector section 3T the relay 3TR releases so that its contact 57 disconnects the wire leading from the left-hand terminal of the winding of relay 9LCTPR over wire 136 to the contacts of the code transmitter and connects it to terminal C of the source.

Hence the relay 9LCTPR ceases to cause coded energy to be supplied to the rails of section 9T, while the contacts of relay 9LCTPR are moved to their right-hand or reverse position in which they connect relay 9LTR across the section rails.

In addition, when relay 3TR releases the opening of its contact 117 releases the relay 3TKSR, Fig. 1E, to pick up relay 3TK and light the lamp 3TKE. The relay 3TKSR becomes picked up again when section 3T is vacated to release relay 3TK and extinguish the lamp 3TKE.

When the train vacates section 9T the coded energy supplied from battery 9LTB to the section rails feeds to relay 9LTR and picks up its contact so that relay 9LTPR picks up and one of its contacts establishes the circuit of relay 9LTFPR. Accordingly, the relay 9LTFPR picks up promptly, and its contact 54 is picked up to prevent the supply of coded energy to relay 9LCTPR, and to maintain the contacts of relay 9LCTPR in their reverse position, after section 3T is vacated and relay 3TR picks up.

As a result of code following operation of relay 9LTR and of its repeater relay 9LTPR, energy is supplied through the decoding transformer 4LDT to the relay 4LHR and its contacts pick up with the result that contact 45 interrupts the circuit of relay 4LCSR and the contacts of relay 4LCSR release. When relay 4LHR picks up, its contact 124 establishes the circuit of relay 4LHPAR and its contacts pick up to establish the circuit of relay 4LHPR. As a result relay 4LHPR picks up to establish a stick circuit to maintain the supply of energy to the relay winding as long as relay 4LHR is picked up, while on picking up of relay 4LHPR the circuit of relay 4LHPAR is interrupted and it releases. During the period in which relay 4LHPAR is picked up energy is supplied to the relay 4LCSPR over the circuit which includes front contact 122 of relay 4LHR, front contact 50 of relay 4LCSPR, and front contact 126 of relay 4LHPAR. Hence, the relay 4LCSPR remains energized after relay 4LCSR releases and interrupts the pick-up circuit for relay 4LCSPR. On release of relay 4LHPAR its contact 126 interrupts the stick circuit for relay 4LCSPR and the release time of the relay begins. As explained above, this relay has a relatively long release time so a considerable time interval elapses before this relay releases. As long as it remains picked up the relay 9LTR continues to respond to coded energy supplied over the rails of section 9T and keeps relays 9LTFPR, 4LHR, and 4LHPR picked up.

On release of relay 4LCSPR its contact 49 establishes the circuit of the relay 4LBKR which picks up and releases relay 4LBK and extinguishes the lamp 2—4BKE to show that the single track stretch has been vacated.

In addition, when relay 4LCSPR releases and relay 3TKSR has become picked up, energy is supplied over front contact 122 of relay 4LHR, back contact 50 of relay 4LCSPR, normal polar contact 191 of relay 4LHSR, and front contact 192 of relay 3TKSR to the relay 4RRR and its contacts pick up so that contact 193 establishes the circuit of relay 4RRPR and its contacts pick up. In addition, when relay 4RRR picks up its contact 193 interrupts the circuit of relay 4LFSR so that it remains released or becomes released if it has picked up. If the relay 4LFSR becomes picked up at this time it will remain picked up only for a short time, and during the time that it is picked up energy is supplied over front contact 195 of relay 4LHPR, back contact 196 of relay 4LHPAR, and front contact 156 of relay 4LFSR to the relay 4LBKR so the relay 4LBKR remain picked up.

When relays 4RRPR and 4RRR are both picked up the wire 136 leading from the left-hand terminal of the winding of the relay 9LCTPR is connected over front contact 55 of relay 4RRPR and front contact 197 of relay 4RRR and wire 198 to the back point of contact 41 of the track relay 9LTR. Accordingly, as soon as relay 9LTR releases, energy is supplied to relay 9LCTPR to move its contacts to their left-hand or normal position in which the battery 9RTB is connected across the rails of section 9T in series with the winding of relay 9LTR so the relay 9LTR is certain to remain released.

As relay 9LTR remains released the relay 9LTPR also remains released and relays 4LHR and 9LTFPR become released. When relay 4LHR releases, its contact 122 interrupts the circuit of relay 4RRR, but because of the condenser connected across the terminals of the relay winding, the contacts of relay 4RRR remain picked up for a substantial time interval after relay 4LHR releases. The energy supplied from battery 9RTB feeds to relay 9RTR, Fig. 1B, and picks up its contact 61 to establish the circuit of relay 7LCTPR and its contact picks up to connect the battery 7RTB across the rails of section 7T and to prevent further operation of relay 7LTR.

The energy supplied from battery 7RTB feeds to relay 7RTR, Fig. 1C, and picks up its contact 30 to interrupt the circuit of relay 7RCTPR and insure that it remains released. In addition, when relay 7RTR picks up, the relays 7RTPR and 7RTFPR become picked up while relay 7RTBPR remains released so that steady energy is supplied to relay 6LCTPR and its contact picks up to connect the battery 6RTB across the rails of section 6T and to insure that relay 6LTR remains released. The energy supplied from battery 6RTB to the rails of section 6T feeds to relay 6RTR, Fig. 1A, and picks up its contact 20 to prevent further supply of coded energy to relay 6RCTPR while relays 6RTPR and 6RTFPR become picked up.

After a time interval the relay 4RRR, Fig. 1E, releases and its contact 197 disconnects the wire 136 leading from the left-hand terminal of the winding of the relay 9LCTPR from wire 198 leading to the source of steady energy at back contact 41 of relay 9LTR and connects this wire over wire 135 and contact 53 to contact 75 of the code transmitter 75CT so that relay 9LCTPR operates to supply coded energy to the rails of section 9T. This coded energy operates relay 9RTR, Fig. 1D, and causes it to supply coded energy to relay 7LCTPR with the result that coded energy is supplied from battery 7RTB to the rails of section 7T. The energy feeds to relay 7RTR, Fig. 1C, and operates it to cause relays 7RTFP, 7RTBP and 6—7HR to become picked up, thereby establishing the circuit governed by the code transmitter 75CT for supplying coded energy to the relay 6LCTPR. Accordingly, the relay 6LCTPR operates to supply coded energy from the battery 6RTB to the rails of section 6T and this energy causes relay 6RTR, Fig. 1A, to operate so that relay 6RTPR operates and causes energy to be supplied through the decoding transformer 2RDT to the relay 2RHR, while relay 6RTFPR is maintained picked up.

When relay 2RHR picks up its contact 82 interrupts the circuit of relay 2RCSR and its contacts release so that contact 113 interrupts the pick-up circuit of relay 2RCSPR. In addition, when relay 2RCSR releases its contact 23 interrupts the circuit for supplying coded energy to relay 6RCTPR to thereby prevent operation of this relay to supply coded energy to the rails of section 6T after coded energy ceases to be supplied to relay 6RTR and the relay 6RTFPR releases.

When relay 2RHR picks up, its contact 84 establishes the circuit of relay 2RHPAR and it picks up to establish the circuit of relay 2RHPR so that the contacts of relay 2RHPR pick up to establish the relay stick circuit and to interrupt the circuit of relay 2RHPAR. As long as relays 2RHR and 2RHPAR are picked up energy is supplied to relay 2RCSPR over its stick circuit so the release time of relay 2RCSPR does not start until relay 2RHR or 2RHPAR releases, and as long as relay 2RCSPR is picked up its contact 114 interrupts the circuit of relay 2RRR and insures that it remains released.

Referring again to Fig. 1E, the relay 4RRPR releases a short time interval after release of relay 4RRR, and when relay 4RRPR releases its contact 55 interrupts the circuit over wire 135 for supplying coded energy to relay 9LCTPR and connects wire 136 leading to the left-hand terminal of the winding of relay 9LCTPR over back contact 54 of relay 9LTFPR, back contact 48 of relay 4LCSR, and back contact 111 of relay 4LSPAR to terminal C of the source so that the contacts of relay 9LCTPR move to their reverse position and remain in that position. When the supply of coded energy to the rails of section 9T is cut off the relay 9RTR remains released and ceases to cause relay 7LCTPR to supply coded energy to the rails of section 7T. Hence relay 7RTR remains released and relays 7RTFP, 7RTBP and 6—7HR become released, thereby interrupting the circuit for supplying coded energy to the relay 6LCTPR and it ceases to cause coded energy to be supplied to the rails of section 6T. As a result relay 6RTR remains released and relays 6RTFPR and 2RHR become released.

When relay 2RHR releases its contact 84 interrupts the circuit of relay 2RHPR so that it releases, while contact 83 of relay 2RHR is open so that energy will not be supplied to relay 2RRR on subsequent release of relay 2RCSPR. After a short time the relay 2RCSPR releases and its contact 91 establishes the circuit of relay 2RBKR and its contacts pick up to release relay 2RBK, Fig. 2. The equipment is now substantially in the condition in which it is shown in the drawings.

The equipment operates in a similar manner if the train which enters the single track stretch at the siding leaves the track stretch at the west end. Under these conditions, the coded energy supplied at the right-hand or east end of the stretch follows the train, so that when the stretch is vacated the equipment at the left-hand or west end of the stretch causes restoring code energy to be supplied to the rails of the stretch. This energy is cascaded or repeated to the right-hand or east end of the stretch where it releases the relay 4LCSR to prevent further supply of energy to the rails of the track stretch at the east end of the stretch and thereby restore the coded track circuit equipment to its normally deenergized condition, while the relays 2RBKR and 4LBKR at the ends of the stretch are picked up and cause the relays 2RBK and 4LBK at the office to be released.

The equipment at the switch includes means for releasing the switch lock after an appropriate time interval if the lock cannot be released as a result of operation of the coded track circuit apparatus.

When the switch is to be unlocked in response to operation of the time element device, the push button 8PB, Fig. 1D, is first operated. This push button is biased by a spring so that its contact 200 is normally open and its contact 201 is normally closed. When the push button is operated, contact 201 is opened and contact 200 is closed so that energy is supplied to relay 8WLSR over the circuit including back contact 202 of relay 8WLPR. Accordingly, the contacts of relay 8WLSR pick up and contact 203 establishes the relay stick circuit which includes back contact 204 of the time element relay 8TER. In addition, when relay 8WLSR picks up its contact 205 interrupts the circuit of relay 8NWPR, while contact 206 of relay 8WLSR establishes the circuit of the relay 8TER. On the supply of energy to the winding of relay 8TER, contact 207 opens promptly, while the other contacts of the relay remain released until after energy has been supplied to the relay winding for a substantial time interval, such as 6 minutes. Accordingly, when the push button 8PB is released and contact 200 opens, the relay 8WLSR is maintained picked up by energy supplied to its stick circuit over back contact 204 of relay 8TER.

The relay 8TER may be of the type shown in Letters Patent of the United States No. 1,966,965, issued July 17, 1934, to Branko Lazich and Harry E. Ashworth.

As explained above, when the switch is to be reversed to permit a train on the siding to enter the main track, the padlock 161 is removed and the segment 160 moves to the position in which contact 164 in the circuit of the relay 8NWPR is open, and in which contact 163 is closed so that relay 8WLPR picks up. When relay 8WLPR picks up, its contact 168 in the circuit of the winding of the lock 8WL is closed, but energy is not supplied to this winding as contact 188 of relay 9LRTBPR is open, and contact 208 of relay 8TER is open. In addition, when relay 8WLPR picks up its front contact 202 in the stick circuit of relay 8WLSR is closed so relay 8WLSR will remain picked up after contact 204 of relay 8TER is opened.

When relay 8WLPR picks up its contact 172 establishes the circuit for supplying energy to the relay 8SPR and this relay cooperates with relay 8SPAR to recurrently energize the relays 9RCTPR and 7LCTPR and cause them to establish the circuits for supplying energy from the track batteries to the track rails. As heretofore explained, this energy may be repeated to an end of the stretch to pick up the code sending relay at that location to cause coded energy to be supplied toward the switch. If coded energy should be received at the switch from both ends of the stretch the relay 9LRTBPR will be energized and the circuit of the winding of the lock 8WL will be established without waiting for the relay 8TER to operate. However, it is assumed that the coded track circuit equipment will not operate to unlock the switch at this time so the relay 9LRTBPR remains released. Hence, the relays 8SPR and 8SPAR operate until the relay 8WLSPR is picked up, which occurs when the switch 8W is reversed and the train on the siding enters section 8T and releases the relay 8TR.

As soon as relay 8NWPR releases, its contacts 37 and 62 interrupt the circuits governed by the track relays 7LTR and 9RTR for operating the transmitter relays 9RCTPR and 7LCTPR and thereby prevents transmission of coded energy past the switch in either direction. This insures that the signals governing movement of traffic toward the switch in both directions will be held at stop as soon as the unlocking of the switch is initiated, and therefore insures that these signals will be held at stop for the full time required to pick up the time element relay 8TER. This time is relatively long, such as 6 minutes, and is long enough to insure that an approaching train will be able to stop before reaching the switch or will overrun the switch before the switch can be unlocked.

After energy has been supplied to the relay 8TER for the time interval required to pick up the relay contacts, its contact 208 completes the circuit of the winding of the lock 8WL and this becomes energized and lifts the locking dog 162, which permits the segment 160 to be moved far enough to release the operating lever of the switch 8W, while on this movement of the segment 160 the contacts 170 and 171 are held in their open position to insure that relay 8NWPR remains released.

When relay 8TER picks up, its contact 204 in the stick circuit for relay 8WLSR is open, but at this time energy is supplied to relay 8WLSR over the branch of its stick circuit which includes front contact 202 of relay 8WLPR. Accordingly, the relay 8WLSR remains picked up and maintains the circuit of the relay 8TER so that contact 208 of relay 8TER maintains the circuit for supplying energy to the winding of the lock 8WL.

Hence, after release of the switch lock 8WL has been secured as a result of operation of the time element relay 8TER, the switch lock will be maintained energized and will keep the switch unlocked until the train crew has completed its use of this switch, as manifested by release of relay 8WLPR which occurs only when the padlock 161 is restored. This eliminates delays which might occur if, before train movements over the switch are completed, the winding of the switch lock 8WL should become deenergized, thereby locking the switch and making it necessary to wait for the time element relay 8TER to operate before the switch could be unlocked to complete the train movements.

After energy is supplied to the winding of the lock 8WL, the switch 8W may be reversed. As long as the operating lever for the switch is out of its normal position the contacts 166 and 167 interrupt the circuit of the relay 8NWPR to insure that it remains released.

When the train on the siding enters section 8T, the relay 8TR releases and its contact 35 interrupts the circuits governed by relays 8SPR and 8SPAR for supplying energy to relays 9RCTPR and 7LCTPR so these relays release and remain released. In addition, when relay 8TR releases its back contact 35 establishes the circuit including front contact 199 of relay 8WLPR for supplying energy to the relay 8WLPSR and its contacts pick up with the result that contact 173 interrupts the circuit of relay 8SPR to insure that relays 8SPR and 8SPAR remain released.

When the train vacates section 8T the relay 8TR picks up and interrupts the pick-up circuit for relay 8WLPSR but this relay is maintained energized by current supplied over the relay stick circuit. When the switch is restored to normal the contacts 166 and 167 connect terminals B and C of the source to the wires leading to the relay 8NWPR.

When the padlock 161 is replaced on the switch lock, the segment 160 is returned to its original position so that contact 164 becomes closed and contact 163 is open. When contact 163 opens, it interrupts the circuit of the relay 8WLPR and it releases to interrupt the circuits of relays 8WLPSR and 8WLSR, and to interrupt the circuit for supplying energy to the relay 8SPR, and to also interrupt the circuit for supplying energy to the winding of the switch lock 8WL so that contacts 170 and 171 become closed.

When relay 8WLSR releases, its contact 206 interrupts the circuit of relay 8TER and its contacts release to complete the circuit of the relay 8NWPR and its contacts pick up so that coded track circuit energy may be transmitted past the switch in either direction, while the equipment at the switch is now substantially in the condition in which it is shown in the drawings.

The release of the switch lock 8WL as a result of operation of the time element relay 8TER will ordinarily be effected only when the stretch in which the switch is located is occupied. During occupancy of a stretch the coded track circuit equipment will govern the apparatus at the ends of the stretch to cause the occupied indication to be displayed at the office. When the switch is restored to its normal position and the track stretch is vacated, the coded track circuit equipment operates as heretofore explained in detail to cause the unoccupied indication to be displayed at the office and to restore the coded track circuit equipment to its normal deenergized condition.

From the foregoing it will be seen that this system provides means controlled entirely from an outlying switch for governing the unlocking of the switch, and that the equipment is arranged so that the energy supplied over the track rails to effect release of the switch lock cannot cause simultaneous clearing of the head block signals at the ends of the stretch. In addition, it will be seen that this system operates to cause the occupied indication to be displayed at the control office when the track stretch is occupied, and also when the switch lock has been released, at which time the track stretch is not available for normal traffic movements.

Although we have herein shown and described only one form of railway signaling system embodying our invention it is understood that various changes and modifications may be made therein within the scope of the appended claims without departing from the spirit and scope of our invention.

Having thus described our invention, what we claim is:

1. In a normally inactive coded track circuit system for a stretch of railway track having means at one end of the stretch for at times supplying coded signaling energy to the track rails for recurrent periods at a predetermined uniform rate and at other times supplying impulses of actuating code energy to the rails recurrently for periods substantially longer than the periods of said coded signaling energy, said system having a code following track relay at the other end of the stretch responsive to energy received over the track rails, a code detector relay selectively responsive to a plurality of successive operations of said track relay at said predetermined rate, a signal controlled by said code detector relay for governing the movement of traffic into said stretch, a slow pick-up code sending stick relay arranged to be picked up in response to the operation of said track relay by an actuating code impulse, and to be released by the operation of said code detector relay, and means controlled by said stick relay when operated for causing said code signaling energy to be supplied to the rails at the adjacent end of the stretch, the combination with the foregoing, of repeating relay means for preventing the clearing of said signal in response to the reception of said actuating code energy in the event such energy is recurrently interrupted due to a fault, comprising a slow acting repeater relay and a slow acting auxiliary relay, a circuit for controlling said signal including a contact of said code detector relay and in addition including contacts of said repeater relay and of said auxiliary relay, said repeater relay and said auxiliary relay being so controlled by said code detector relay that at least one of said contacts is closed only when said code detector relay has been in its energized position for a time which is greater than the period of said actuating code energy.

2. In a coded track circuit system of the type recited in claim 1, in which the auxiliary relay and the repeating relay are of the slow pick-up slow release type and in which the auxiliary relay has an energizing circuit including a front contact of the code detector relay and a back contact of the repeater relay, the repeater relay has a pick-up circuit including a front contact of the auxiliary relay and a stick circuit including its own front contact and a front contact of the code detector relay, and the circuit for controlling said signal includes front contacts of the code detector relay and its repeater relay and a back contact of said auxiliary relay.

3. In a coded track circuit system for a stretch of railway track having at each end of the stretch a code transmitter relay for supplying impulses of coded signaling energy to the track rails at times and for supplying actuating code impulses of energy to said track rails at other times for recurrent periods substantially longer than the impulses of coded signaling energy, a code sending stick relay at each end of the stretch for controlling the operation of the associated transmitter relay, a slow release repeater relay for each code sending relay, a code following track relay at each end of the stretch responsive to energy received over the rails of the stretch, a code detector relay at each end of the stretch, with means controlled by each track relay for energizing the associated code detector relay in response to the reception of a plurality of successive impulses of coded signaling energy and for energizing the associated code sending relay and code sending repeater relay in response to the reception of an actuating code impulse having said longer period, the combination with the foregoing of a code detector repeater relay and an auxiliary relay, both of the slow pick-up slow release type, at each end of the stretch, a circuit for each auxiliary relay including a front contact of the associated code detector relay and a back contact of its repeater relay, a pick-up circuit for each code sending repeater relay including a front contact of the associated code sending relay, a stick circuit for each code sending repeater relay including its own front contact and front contacts of the associated auxiliary relay and of the associated code detector relay, respectively, a signal at each end of the stretch for controlling traffic movements into the stretch, and an energizing circuit for each signal including in series front contacts of the code detector relay and of the code detector repeater relay, and back contacts of the auxiliary relay and of the code sending repeater relay, at the same end of the stretch.

4. In a coded track circuit system of the type recited in claim 3, in which a traffic relay is provided at each end of the stretch for controlling the operation of a block indicator at a control office and a restoring code relay is provided for restoring the system to an inactive condition, a pick-up circuit for each traffic relay including front contacts of the associated code detector relay and code detector repeater relay, and a back contact of the associated auxiliary relay, a stick circuit for each traffic relay including a back contact of the associated code detector relay, said pick-up and stick circuits also including back contacts of the associated restoring code relay and code sending repeater relay, said restoring code relay being operated by the associated code detector relay to open its contact when the stretch is vacated by a train, and a circuit effective only when said traffic relay is energized for causing said block indicator to indicate the occupancy of said stretch in response to the release of said code detector repeater relay.

5. Block indication apparatus for indicating occupancy of a stretch of railway track equipped with a normally inactive reversible coded track circuit system of the type having a remotely controllable code sending stick relay at each end effective when energized to cause coded signaling energy to be supplied to the track rails of the stretch, said system having actuating means and restoring means at each end of the stretch for operating the code sending stick relay at the opposite end and for releasing such relay to restore the system to its inactive condition said system also having a code detector relay at each end responsive to coded signaling energy received over the rails from the opposite end when unoccupied; said block indication apparatus comprising a block indicator at a central office, two indication relays at said office controllable from the opposite ends of the stretch, a locally controlled traffic relay at each end of the stretch, means for operating each traffic relay when the adjacent code detector relay is operated, means for releasing such traffic relay when the adjacent restoring means is operated to restore the system to its inactive condition, remote control means for operating each indication relay rendered effective when the traffic relay for the corresponding end of the stretch is energized and the associated code detector relay is released, and also when such traffic relay is released and the associated code sending relay is energized, and means for causing said block indicator to indicate the occupancy of said stretch when and only when both said indication relays are operated.

6. Block indication apparatus for indicating occupancy of a stretch of railway track equipped with a normally inactive reversible coded track circuit system of the type having a remotely controllable code sending stick relay at each end effective when energized to cause coded signaling energy to be supplied to the track rails of the stretch, and having a code detector relay at each end responsive to coded signaling energy received over the rails from the opposite end when unoccupied; said system including a manually controllable relay at each end of the stretch with means responsive to its operation when the system is in its inactive condition for supplying an actuating code to the rails for operating the code sending relay at the opposite end of the stretch, said system also including means responsive to the operation of each code detector relay when the associated manually controllable relay is in its normal condition for supplying a restoring code to the rails for releasing the code sending relay at the opposite end; said block indication apparatus comprising a block indicator at a central office, two indication relays at said office controllable from the opposite ends of the stretch, a traffic relay at each end of the stretch, means for operating each traffic relay in response to the operation of the associated code detector relay when said system is rendered active and for releasing such traffic relay when a restoring code is transmitted to render the system inactive, remote control means for operating each indication relay effective either when the traffic relay for the same end of the stretch is operated and the associated code detector relay is released, or when the traffic relay for the same end of the stretch is released and the associated code sending relay is operated, and means for causing said block indicator to indicate the occupancy of said stretch when and only when both said indication relays are operated.

7. Apparatus for indicating the condition of an outlying track switch in a stretch of railway track equipped with a normally inactive reversible coded track circuit system of the type recited in claim 5, said track switch being equipped with an electric lock which normally locks the switch in its normal position and which must be energized to enable the switch to be operated to its reverse position; said apparatus comprising manually operable means at the switch location, effective when operated, to cause actuating code energy to be supplied to the rails of the two portions of the stretch which extend in opposite directions from the stretch for energizing the code sending relays at both ends of the stretch, whereby the indication relays at the office for both ends of the stretch are energized to cause the display of an occupied block indication by the block indicator irrespective of the condition of occupancy of the stretch, and means effective only when said switch is locked in its normal position by said electric lock for enabling restoring code energy to be transmitted over the rails from one end of the stretch to the other to effect the release of said code sending relays.

8. Apparatus for the control of an outlying track switch located in a stretch of railway track equipped with a normally inactive reversible coded track circuit system, said system having a code sending stick relay at each end responsive to actuating code energy received over the rails of the stretch, each such code sending relay being effective when energized to cause coded signaling energy to be supplied to the rails of the stretch, said system having means at each end of the stretch responsive to coded energy received over the rails for releasing the associated code sending relay, said apparatus comprising an electric lock which normally locks the switch in its normal position and must be energized to enable the switch to be operated to its reverse position, manually operable means at the switch location for supplying actuating code energy to the rails of the portions of the stretch extending in opposite directions from the switch location to energize the code sending relays at both ends of the stretch, two code detector relays at the switch location, one for each portion, each responsive to coded energy received over the rails of such portion, means for stopping the supply of actuating code energy to each portion when the code detector relay for such portion becomes energized, means for energizing said electric lock effective only when both code detector relays at the switch location are energized, and means at the switch location effective only when the switch is locked in its normal position by said electric lock for supplying coded energy to the rails of each portion in response to coded energy received over the rails of the other portion, for effecting the release of said code sending relays.

9. Apparatus for the control of an outlying track switch located in a stretch of railway track equipped with a normally inactive coded reversible track circuit system, said system having a normally inactive code transmitter relay at each end of the stretch for supplying impulses of coded signaling energy to the rails of the stretch and having a code sending relay at each end effective when energized to render the associated code transmitter relay active, said system including means for energizing each code sending relay when an impulse of actuating code energy is received over the rails and for releasing such relay when impulses of coded signaling energy are received over the rails, said apparatus including a switch lock lever, equipped with an electric lock for normally locking the switch in its normal position, said lever being manually operable from a normal position to a preliminary position when said lock is deenergized, and from said preliminary position to a reverse position in which it unlocks the switch to enable the switch to be operated, only when said electric lock is energized, means effective when said lever is moved to said preliminary position for supplying actuating code energy to the rails of the portions of the stretch which extend in opposite directions from the switch location, means for terminating the supply of such energy to each portion when coded signaling energy is received over the rails of such portion, at the switch location, means for energizing said electric lock when coded signaling energy is received at the switch location over the rails of both said portions, and means effective only when the track switch is locked in its normal position for supplying coded signaling energy at the switch location to the rails of each track portion in turn to release said code sending relays.

10. Apparatus for the control of an outlying track switch of the type recited in claim 9, in which a short release track section having a track relay is interposed between the sections forming the two portions of the coded track circuit system, and in which means are provided for energizing said electric lock when said track relay is released irrespective of the condition of said coded track circuit system, and the means for supplying actuating code impulses to the track rails is effective only when such track relay is energized.

11. Apparatus for the control of an outlying track switch of the type recited in claim 9, in which a manually operable push button, a stick relay and a time element relay are provided at the switch location, said stick relay having a pick-up circuit including a normally open contact of said push button and a contact closed when said switch lock lever is in its normal position and a stick circuit closed by said switch lock lever in its preliminary position, said apparatus also including means for energizing said time element relay when said stick relay is energized and means controlled by said time element relay, but effective only after such relay has been energized for an extended period of time, for energizing said electric lock.

12. Apparatus for the control of an outlying track switch of the type recited in claim 9, in which a code following track relay and a slow release repeater relay is provided for each portion of the stretch, which relays assume their energized positions when energy is received at the switch location over the rails of the corresponding portion of the stretch, and the means for supplying actuating code energy to the rails of each portion is controlled over a circuit which includes a back contact of the slow release repeater relay controlled by the track relay for such portion.

13. Apparatus for the control of an outlying track switch of the type recited in claim 9, in which a switch repeater relay is provided which is energized only when the switch is locked in its normal position, said electric lock is deenergized and its lever is in its normal position, and in which the means for energizing the electric lock comprises a code detector relay for each portion which is responsive to coded signaling energy received over the rails of its portion only when said repeater relay is released.

14. Apparatus for the control of an outlying track switch of the type recited in claim 9, in which the actuating code impulses are generated by a pair of actuating code relays which operate periodically when supplied with energy, and in which energy is supplied to said relays when the lock lever is moved to its preliminary position and such supply is interrupted when both code detector relays become energized.

CHARLES W. FAILOR.
CHARLES B. SHIELDS.

References Cited in the file of this patent

UNITED STATES PATENTS

| Number | Name | Date |
|---|---|---|
| 2,326,991 | Young | Aug. 17, 1943 |
| 2,344,573 | Van Horn | Mar. 21, 1944 |
| 2,401,201 | Thompson | May 28, 1946 |
| 2,510,324 | Talbert | June 6, 1950 |
| 2,520,858 | Shields | Aug. 29, 1950 |
| 2,549,151 | Young | Apr. 17, 1951 |
| 2,552,862 | Pascoe et al. | May 15, 1951 |
| 2,558,473 | Young | June 26, 1951 |